United States Patent
Han et al.

(10) Patent No.: US 11,871,237 B1
(45) Date of Patent: Jan. 9, 2024

(54) PAIRING A PAYMENT OBJECT READER WITH A POINT-OF-SALE TERMINAL

(71) Applicant: Block, Inc., San Francisco, CA (US)

(72) Inventors: Koun Han, San Francisco, CA (US); Michael Wells White, San Francisco, CA (US); Robert Harrison Gilliam, San Francisco, CA (US)

(73) Assignee: Block, Inc., Oakland, CA (US)

(*) Notice: Subject to any disclaimer, the term of this patent is extended or adjusted under 35 U.S.C. 154(b) by 511 days.

(21) Appl. No.: 15/199,388

(22) Filed: Jun. 30, 2016

(51) Int. Cl.
*H04W 12/50* (2021.01)
*H04W 4/02* (2018.01)
(Continued)

(52) U.S. Cl.
CPC .......... *H04W 12/50* (2021.01); *G06Q 20/202* (2013.01); *G06Q 20/327* (2013.01);
(Continued)

(58) Field of Classification Search
CPC ...... G06Q 30/06; G06Q 20/202; G06Q 20/20; G06Q 20/3278; G06Q 20/209; G06Q 20/3224; G06Q 20/327; H04B 7/26; H04B 17/318; H04W 12/50; H04W 12/55; H04W 92/10; H04W 4/022; H04W 4/021; H04W 4/027; H04W 4/029
(Continued)

(56) References Cited

U.S. PATENT DOCUMENTS 3,128,349 A   4/1964 Boesch et al.
4,405,829 A   9/1983 Rivest et al.
(Continued)

FOREIGN PATENT DOCUMENTS

AU   2324402 A   6/2002
CA   2 990 199 A1   1/2017
(Continued)

OTHER PUBLICATIONS

Liu, Chin-Jung. Improving Spectrum Efficiency in Heterogenous Wireless Networks. Michigan State University, ProQuest Dissertations Publications. 2018 . . . (Year: 2018).*
(Continued)

*Primary Examiner* — Nathan C Uber
*Assistant Examiner* — Fawaad Haider
(74) *Attorney, Agent, or Firm* — Lee & Hayes, P.C.

(57) ABSTRACT

In some examples, a system and method for pairing a payment object reader with a point-of-sale (POS) terminal is described herein. The method includes determining, by a wireless transceiver, a first value of signal strength corresponding to a current position of the payment object reader and a second value of signal strength corresponding to a new position of the payment object reader. The POS terminal then identifies the first wireless device as an intended candidate for pairing with the second wireless device based on variation in signal strength from the first value of signal strength to the second value of signal strength. Accordingly, the POS terminal establishes a wireless communication channel between the POS terminal and the payment object reader device for exchange of information. Once paired, the payment object reader allows the POS terminal to accept payments from a customer.

25 Claims, 12 Drawing Sheets

(51) Int. Cl.

| | |
|---|---|
| *H04W 4/021* | (2018.01) |
| *H04B 17/318* | (2015.01) |
| *H04W 92/10* | (2009.01) |
| *H04W 12/55* | (2021.01) |
| *H04W 4/029* | (2018.01) |
| *G07G 1/00* | (2006.01) |
| *G06K 7/08* | (2006.01) |
| *H04B 7/26* | (2006.01) |
| *G07G 1/12* | (2006.01) |
| *G06Q 20/20* | (2012.01) |
| *G06Q 20/32* | (2012.01) |
| *G06Q 30/02* | (2023.01) |
| *G06Q 20/34* | (2012.01) |
| *G06Q 30/0251* | (2023.01) |

(52) U.S. Cl.
CPC ........ *G06Q 20/3224* (2013.01); *H04B 17/318* (2015.01); *H04W 4/021* (2013.01); *H04W 4/022* (2013.01); *H04W 4/027* (2013.01); *H04W 4/029* (2018.02); *H04W 12/55* (2021.01); *H04W 92/10* (2013.01); *G06K 7/084* (2013.01); *G06Q 20/204* (2013.01); *G06Q 20/3278* (2013.01); *G06Q 20/341* (2013.01); *G06Q 20/347* (2013.01); *G06Q 30/0253* (2013.01); *G07G 1/009* (2013.01); *G07G 1/0036* (2013.01); *G07G 1/12* (2013.01); *H04B 7/26* (2013.01); *H04M 2250/14* (2013.01)

(58) Field of Classification Search
USPC .......................................................... 705/21
See application file for complete search history.

(56) References Cited

U.S. PATENT DOCUMENTS

| | | | |
|---|---|---|---|
| 4,776,003 A | 10/1988 | Harris | |
| 4,860,336 A | 8/1989 | D'Avello et al. | |
| 5,221,838 A | 6/1993 | Gutman et al. | |
| 5,241,161 A | 8/1993 | Zuta | |
| 5,351,296 A | 9/1994 | Sullivan | |
| 5,388,155 A | 2/1995 | Smith | |
| 5,408,513 A | 4/1995 | Busch, Jr. et al. | |
| 5,434,395 A | 7/1995 | Storck et al. | |
| 5,714,741 A | 2/1998 | Pieterse et al. | |
| 5,729,591 A | 3/1998 | Bailey | |
| 5,740,232 A | 4/1998 | Pailles et al. | |
| 5,789,733 A | 8/1998 | Jachimowicz et al. | |
| 5,838,773 A | 11/1998 | Eisner et al. | |
| 5,850,599 A | 12/1998 | Seiderman | |
| 5,867,795 A | 2/1999 | Novis et al. | |
| 5,940,510 A | 8/1999 | Curry et al. | |
| 6,010,067 A | 1/2000 | Elbaum | |
| 6,098,881 A | 8/2000 | Deland, Jr. et al. | |
| 6,144,336 A | 11/2000 | Preston et al. | |
| 6,234,389 B1 | 5/2001 | Valliani et al. | |
| 6,278,779 B1 | 8/2001 | Bryant et al. | |
| 6,327,578 B1 | 12/2001 | Linehan | |
| 6,481,623 B1 | 11/2002 | Grant et al. | |
| 6,886,742 B2 | 5/2005 | Stoutenburg et al. | |
| 6,990,683 B2 | 1/2006 | Itabashi | |
| 7,003,316 B1 | 2/2006 | Elias et al. | |
| 7,040,534 B2 | 5/2006 | Turocy et al. | |
| 7,065,645 B2 | 6/2006 | Teicher | |
| 7,066,382 B2 | 6/2006 | Kaplan | |
| 7,083,090 B2 | 8/2006 | Zuili | |
| 7,124,953 B2 | 10/2006 | Anttila et al. | |
| 7,163,148 B2 | 1/2007 | Durbin et al. | |
| 7,210,627 B2 | 5/2007 | Morley et al. | |
| 7,424,732 B2 | 9/2008 | Matsumoto et al. | |
| 7,433,452 B2 | 10/2008 | Taylor et al. | |
| 7,591,425 B1 | 9/2009 | Zuili et al. | |
| 7,673,799 B2 | 3/2010 | Hart et al. | |
| 7,810,729 B2 | 10/2010 | Morley, Jr. | |
| 7,865,430 B1 | 1/2011 | Kolls | |
| 7,884,734 B2 * | 2/2011 | Izadi | H04W 76/14 |
| | | | 702/152 |
| 7,896,248 B2 | 3/2011 | Morley, Jr. | |
| 8,086,531 B2 | 12/2011 | Litster et al. | |
| 8,126,734 B2 | 2/2012 | Dicks et al. | |
| 8,128,002 B2 | 3/2012 | McCallum et al. | |
| 8,265,553 B2 | 9/2012 | Cheon et al. | |
| 8,397,988 B1 | 3/2013 | Zuili | |
| 8,768,838 B1 | 7/2014 | Hoffman | |
| 8,983,873 B2 | 3/2015 | Lund | |
| 9,020,853 B2 | 4/2015 | Hoffman et al. | |
| 9,022,285 B2 | 5/2015 | Graylin | |
| 9,022,291 B1 | 5/2015 | van der Merwe et al. | |
| 9,022,292 B1 | 5/2015 | van der Merwe et al. | |
| 9,047,599 B1 | 6/2015 | Lambert et al. | |
| 9,128,703 B1 | 9/2015 | Lachwani et al. | |
| 9,173,098 B1 | 10/2015 | Ran et al. | |
| 9,286,500 B1 | 3/2016 | Post et al. | |
| 9,312,949 B1 | 4/2016 | Templeton et al. | |
| 9,443,118 B1 | 9/2016 | Templeton et al. | |
| 9,489,670 B2 | 11/2016 | McGill | |
| 9,530,032 B2 | 12/2016 | Post et al. | |
| 9,633,350 B2 | 4/2017 | Post et al. | |
| 9,679,286 B2 | 6/2017 | Colnot et al. | |
| 9,715,585 B2 | 7/2017 | Seema | |
| 9,911,118 B2 | 3/2018 | Carlson | |
| 10,068,550 B1 | 9/2018 | Chen | |
| 10,120,427 B1 | 11/2018 | Hebner et al. | |
| 11,516,019 B1 | 11/2022 | Maeng et al. | |
| 2001/0015377 A1 | 8/2001 | Vassura et al. | |
| 2001/0021980 A1 | 9/2001 | Linden et al. | |
| 2002/0091633 A1 | 7/2002 | Proctor | |
| 2002/0153414 A1 | 10/2002 | Stoutenburg et al. | |
| 2003/0135418 A1 | 7/2003 | Shekhar et al. | |
| 2003/0154414 A1 | 8/2003 | von Mueller et al. | |
| 2003/0183691 A1 | 10/2003 | Lahteenmaki et al. | |
| 2004/0012875 A1 | 1/2004 | Wood | |
| 2004/0041911 A1 | 3/2004 | Odagiri et al. | |
| 2004/0059682 A1 | 3/2004 | Hasumi et al. | |
| 2004/0099746 A1 | 5/2004 | Norton | |
| 2004/0167820 A1 | 8/2004 | Melick et al. | |
| 2004/0204082 A1 | 10/2004 | Abeyta | |
| 2005/0097015 A1 | 5/2005 | Wilkes et al. | |
| 2005/0109841 A1 | 5/2005 | Ryan et al. | |
| 2005/0236480 A1 | 10/2005 | Vrotsos et al. | |
| 2005/0243059 A1 | 11/2005 | Morris et al. | |
| 2005/0247787 A1 | 11/2005 | Von Mueller et al. | |
| 2006/0032905 A1 | 2/2006 | Bear et al. | |
| 2006/0049255 A1 | 3/2006 | von Mueller et al. | |
| 2006/0135204 A1 | 6/2006 | Angelhag | |
| 2006/0219776 A1 | 10/2006 | Finn | |
| 2006/0223580 A1 | 10/2006 | Antonio et al. | |
| 2007/0022058 A1 | 1/2007 | Labrou et al. | |
| 2007/0067833 A1 | 3/2007 | Colnot | |
| 2007/0070035 A1 | 3/2007 | Asbury et al. | |
| 2007/0168300 A1 | 7/2007 | Quesselaire et al. | |
| 2007/0194104 A1 | 8/2007 | Fukuda et al. | |
| 2007/0198436 A1 | 8/2007 | Weiss | |
| 2007/0251997 A1 | 11/2007 | Brown et al. | |
| 2008/0014984 A1 | 1/2008 | Brown et al. | |
| 2008/0017704 A1 | 1/2008 | VanDeburg et al. | |
| 2008/0091617 A1 | 4/2008 | Hazel et al. | |
| 2008/0113618 A1 * | 5/2008 | De Leon | H04M 1/72412 |
| | | | 455/41.2 |
| 2008/0237345 A1 | 10/2008 | Moullette et al. | |
| 2009/0033513 A1 * | 2/2009 | Salsbury | H04W 24/00 |
| | | | 340/4.2 |
| 2009/0067846 A1 | 3/2009 | Yu et al. | |
| 2009/0070583 A1 | 3/2009 | von Mueller et al. | |
| 2009/0112768 A1 | 4/2009 | Hammad et al. | |
| 2009/0164326 A1 | 6/2009 | Bishop et al. | |
| 2009/0188977 A1 | 7/2009 | Adams et al. | |
| 2009/0195402 A1 | 8/2009 | Izadi et al. | |
| 2009/0282261 A1 | 11/2009 | Khan et al. | |
| 2010/0012715 A1 | 1/2010 | Williams et al. | |
| 2010/0057620 A1 | 3/2010 | Li et al. | |

(56) References Cited

U.S. PATENT DOCUMENTS

| | | | |
|---|---|---|---|
| 2010/0087144 A1* | 4/2010 | Korenshtein | H04B 17/318 455/41.2 |
| 2010/0138666 A1 | 6/2010 | Adams et al. | |
| 2010/0235621 A1 | 9/2010 | Winkler et al. | |
| 2010/0243732 A1 | 9/2010 | Wallner | |
| 2010/0257101 A1 | 10/2010 | Fierro | |
| 2010/0304819 A1 | 12/2010 | Stockdale et al. | |
| 2011/0070834 A1 | 3/2011 | Griffin et al. | |
| 2011/0159959 A1 | 6/2011 | Mallinson et al. | |
| 2011/0210848 A1* | 9/2011 | Howard | G08B 13/1427 340/539.32 |
| 2012/0126011 A1 | 5/2012 | Lamba et al. | |
| 2012/0254622 A1 | 10/2012 | Kanungo | |
| 2012/0324501 A1 | 12/2012 | Klein et al. | |
| 2013/0030931 A1* | 1/2013 | Moshfeghi | G01S 5/0257 705/16 |
| 2013/0084801 A1 | 4/2013 | Royston et al. | |
| 2013/0096701 A1 | 4/2013 | Suorajaervi et al. | |
| 2013/0124346 A1 | 5/2013 | Baldwin et al. | |
| 2013/0182845 A1 | 7/2013 | Monica et al. | |
| 2013/0198516 A1 | 8/2013 | Fenton et al. | |
| 2013/0328801 A1 | 12/2013 | Quigley et al. | |
| 2014/0001263 A1 | 1/2014 | Babu et al. | |
| 2014/0001264 A1 | 1/2014 | Babu et al. | |
| 2014/0016945 A1 | 1/2014 | Pan | |
| 2014/0019304 A1 | 1/2014 | Lee et al. | |
| 2014/0025517 A1 | 1/2014 | Argue et al. | |
| 2014/0029913 A1 | 1/2014 | Lopez et al. | |
| 2014/0122884 A1 | 5/2014 | Pieczul et al. | |
| 2014/0138435 A1 | 5/2014 | Khalid | |
| 2014/0267934 A1 | 9/2014 | Hardin | |
| 2014/0316560 A1 | 10/2014 | Hoormann et al. | |
| 2014/0325220 A1 | 10/2014 | Tunnell et al. | |
| 2014/0355389 A1* | 12/2014 | Reunamaki | G08C 23/02 367/197 |
| 2014/0372320 A1* | 12/2014 | Goldfarb | G07F 7/1033 705/72 |
| 2015/0133047 A1 | 5/2015 | Smith et al. | |
| 2015/0234525 A1 | 8/2015 | Yisraelian | |
| 2015/0278506 A1 | 10/2015 | Jun et al. | |
| 2015/0287030 A1 | 10/2015 | Sagady et al. | |
| 2015/0334351 A1 | 11/2015 | Cocchi et al. | |
| 2015/0347738 A1 | 12/2015 | Ulrich et al. | |
| 2015/0348009 A1 | 12/2015 | Brown et al. | |
| 2016/0007290 A1 | 1/2016 | Lindemann et al. | |
| 2016/0019512 A1* | 1/2016 | Buchheim | G06Q 20/227 705/73 |
| 2016/0088711 A1 | 3/2016 | Ng et al. | |
| 2016/0098711 A1* | 4/2016 | Patel | G06Q 20/3829 705/44 |
| 2016/0112825 A1 | 4/2016 | Miller | |
| 2016/0134709 A1 | 5/2016 | Savolainen | |
| 2016/0198210 A1 | 7/2016 | Torikai et al. | |
| 2016/0275478 A1 | 9/2016 | Li et al. | |
| 2016/0307189 A1 | 10/2016 | Zarakas et al. | |
| 2017/0004475 A1 | 1/2017 | White et al. | |
| 2017/0091732 A1 | 3/2017 | Rezayee et al. | |
| 2017/0091762 A1 | 3/2017 | Rezayee et al. | |
| 2017/0109743 A1 | 4/2017 | Zarakas et al. | |
| 2017/0164214 A1* | 6/2017 | Hara | H04B 7/15507 |
| 2017/0265038 A1* | 9/2017 | Lin | H04B 17/27 |
| 2017/0325161 A1 | 11/2017 | Kwon et al. | |
| 2019/0385149 A1 | 12/2019 | Wurmfeld et al. | |

FOREIGN PATENT DOCUMENTS

| | | |
|---|---|---|
| CA | 2990199 C | 6/2021 |
| DE | 20320080 U1 | 4/2004 |
| EP | 0 895 203 A2 | 2/1999 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| RU | 2604801 C2 * | 12/2016 ............ G01S 1/02 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/004070 A1 | 1/2017 |
| WO | 2017/053736 A1 | 3/2017 |

OTHER PUBLICATIONS

Silva, Agnelo Rocha da. Theory and Design of Magnetic Induction-Based Wireless Underground Sensor Networks. University of Southern California. ProQuest Dissertations Publishing, 2015. (Year: 2015).*

Wilson, Anthony Joseph. Device-free localization with received signal strength measurements in wireless networks. The University of Utah ProQuest Dissertations Publishing, 2010. (Year: 2010).*

International Search Report and Written Opinion for International Patent Application No. PCT/US2016/039872, dated Nov. 29, 2016.

Zoltan, M.B., "How Do I Pair My Phone to a Bluetooth Device?," TechHive, Published on Nov. 1, 2010, Retrieved from the internet URL: http://www.techhive.com/article/209431/pair_phone_with_bluetooth_device.html, on Nov. 10, 2014, pp. 1-3.

Non-Final Office Action dated Nov. 5, 2015, for U.S. Appl. No. 13/786,373, of Templeton, T., et al., filed Mar. 5, 2013.

Notice of Allowance dated Dec. 22, 2015, for U.S. Appl. No. 13/786,373, of Templeton, T., et al., filed Mar. 5, 2013.

Notice of Allowance dated May 18, 2016, for U.S. Appl. No. 15/056,961, of Templeton, T., et al., filed Feb. 29, 2016.

Tobias H. "Flashlight: Optical Communication between Mobile Phones and Interactive Tabletops," Saarbrucken, Germany,ITS 2010: Interactions, Nov. 7-10, 2010, pp. 135-138.

Non-Final Office Action dated Oct. 2, 2014, for U.S. Appl. No. 13/841,689, of Post, D.J., et al., filed Mar. 15, 2013.

Non-Final Office Action dated Apr. 20, 2015, for U.S. Appl. No. 13/841,689, of Post, D.J., et al., filed Mar. 15, 2013.

(56) References Cited

OTHER PUBLICATIONS

Final Office Action dated Oct. 1, 2015, for U.S. Appl. No. 13/841,689, of Post, D.J., et al., filed Mar. 15, 2013.
Notice of Allowance dated Nov. 6, 2015, for U.S. Appl. No. 13/841,689, of Post, D.J., et al., filed Mar. 15, 2013.
Notice of Allowance dated Feb. 12, 2016, for U.S. Appl. No. 13/841,689, of Post, D.J., et al., filed Mar. 15, 2013.
Non-Final Office Action dated Apr. 21, 2016, for U.S. Appl. No. 14/966,985, of Post, D.J., et al., filed Dec. 11, 2015.
Non-Final Office Action dated Jun. 16, 2016, for U.S. Appl. No. 14/864,423, of Rezayee, A., et al., filed Sep. 24, 2015.
Non-Final Office Action dated Jun. 27, 2016, for U.S. Appl. No. 14/709,394, of Chen, G.H., filed May 11, 2015.
Notice of Allowance dated Aug. 15, 2016, for U.S. Appl. No. 14/966,985, of Post, D.J., et al., filed Dec. 11, 2015.
Notice of Allowance dated Nov. 17, 2016, for U.S. Appl. No. 14/966,985, of Post, D.J., et al., filed Dec. 11, 2015.
Final Office Action dated Nov. 25, 2016, for U.S. Appl. No. 14/864,423, of Rezayee, A., et al., filed Sep. 24, 2015.
Notice of Allowance dated Dec. 29, 2016, for U.S. Appl. No. 14/709,394, of Chen, G.H., filed May 11, 2015.
Notice of Allowance dated Jan. 9, 2017, for U.S. Appl. No. 15/355,709, of Post, D. J., et al., filed Nov. 18, 2016.
Non-Final Office Action dated Jul. 26, 2017, for U.S. Appl. No. 14/864,423, of Rezayee, A., et al., filed Sep. 24, 2015.
Non-Final Office Action dated Jan. 12, 2018, for U.S. Appl. No. 15/086,002, of Hebner, N., et al., filed Mar. 30, 2016.
Notice of Allowance dated May 1, 2018, for U.S. Appl. No. 15/471,062, of Chen, G.H., filed Mar. 28, 2017.
Notice of Allowance dated Jul. 3, 2018, for U.S. Appl. No. 15/086,002, of Hebner, N., et al., filed Mar. 30, 2016.
Examiner Requisition for Canadian Patent Application No. 2,990,199, dated Sep. 17, 2018.
International Search Report and Written Opinion for International Application No. PCT/US2016/053354, dated Nov. 16, 2016.
Supplementary European Search Report for European Patent Application No. 16818610.4, dated Oct. 26, 2018.
Du, W., "A mobile Signing Solution Based on Personal Transaction Protocol and J2ME," Diss. University of Ottawa (Canada), pp. 1-111 (2006).
Final Office Action dated Feb. 20, 2019, for U.S. Appl. No. 14/864,423, of Rezayee, A. et al., filed Sep. 24, 2015.
Non-Final Office Action dated Feb. 26, 2019, for U.S. Appl. No. 14/855,130, of White, M. W., et al., filed Sep. 15, 2015.
Non-Final Office Action dated Apr. 19, 2019, for U.S. Appl. No. 14/864,547, of Rezayee, A. et al., filed Sep. 24, 2015.
Decision to Grant for European Patent Application No. 16775952.1, dated Apr. 26, 2019.
Adam C., Master Key. In: Encyclopedia of Cryptography and Security, Tilborg V., et al., eds., Springer, Boston, 2011, p. 762.
Examiner Requisition for Canadian Patent Application No. 2,990,199, dated Aug. 8, 2019.
Final Office Action dated Sep. 18, 2019, for U.S. Appl. No. 14/855,130, of White, M.W., et al., filed Sep. 15, 2015.
Non-Final Office Action dated Oct. 10, 2019, for U.S. Appl. No. 14/864,423, of Rezayee, A. et al., filed Sep. 24, 2015.
Final Office Action dated Oct. 17, 2019, for U.S. Appl. No. 14/864,547, of Rezayee, A., et al., filed Sep. 24, 2015.
Advisory Action dated Jan. 17, 2020, for U.S. Appl. No. 14/864,547, of Rezayee, A., et al., filed Sep. 24, 2015.
Examination Report for European Patent Application No. 16818610.4, dated Nov. 26, 2019.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"EMBEDDED FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Non-Final Office Action dated Apr. 13, 2020, for U.S. Appl. No. 14/864,423 of Rezayee, A., et al., filed Sep. 24, 2015.
Non-Final Office Action dated Jul. 24, 2020, for U.S. Appl. No. 14/855,130, of White, M.W., et al., filed Sep. 15, 2015.
Supplemental Notice of Allowability dated Nov. 5, 2020, U.S. Appl. No. 14/864,423 of Rezayee, A., et al., filed Sep. 24, 2015.
Non-Final Office Action dated Oct. 21, 2020, for U.S. Appl. No. 14/864,547, of Rezayee, A., et al., filed Sep. 24, 2015.
Notice of Allowance dated Oct. 22, 2020, for U.S. Appl. No. 14/864,423 of Rezayee, A., et al., filed Sep. 24, 2015.
Supplemental Notice of Allowability dated Jan. 15, 2021, for U.S. Appl. No. 14/864,423 of Rezayee, A., et al., filed Sep. 24, 2015.
Final Office Action dated Mar. 18, 2021, for U.S. Appl. No. 14/855,130, of White, M.W., et al., filed Sep. 15, 2015.
Advisory Action dated Jun. 15, 2021, for U.S. Appl. No. 14/855,130, of White, M.W., et al., filed Sep. 15, 2015.
Non-Final Office Action dated Jul. 23, 2021, for U.S. Appl. No. 14/855,130, of White, M.W., et al., filed Sep. 15, 2015.
Final Office Action dated Apr. 12, 2021, for U.S. Appl. No. 14/864,547, of Rezayee, A., et al., filed Sep. 24, 2015.
Notice of Allowance dated Apr. 14, 2021, U.S. Appl. No. 14/864,423 of Rezayee, A., et al., filed Sep. 24, 2015.
Summons to attend oral proceedings for European Patent Application No. 16818610.4, mailed May 24, 2021.
Non-Final Office Action dated Nov. 29, 2021, for U.S. Appl. No. 14/864,547, of Rezayee, A., et al., filed Sep. 24, 2015.
Final Office Action dated Feb. 7, 2022, for U.S. Appl. No. 14/855,130, of White, M.W., et al., filed Sep. 15, 2015.

* cited by examiner

| Location | LA | L1 | L2 | L3 | | LA |
|---|---|---|---|---|---|---|
| POS-N | 801-900 | - | 650 | 900 | 250 | 850 |
| ... | - | - | - | - | - | - |
| POS-2 | 501-600 | - | 300 | 600 | 300 | 650 |
| POS-1 | 400-500 | - | 300 | 500 | 200 | 450 |
| | RSSI Threshold Range | RSSI Range | RSSI Range | RSSI Range | RSSI Delta | RSSI Absolute |

152A, 152B, 152C, 152D, 152E

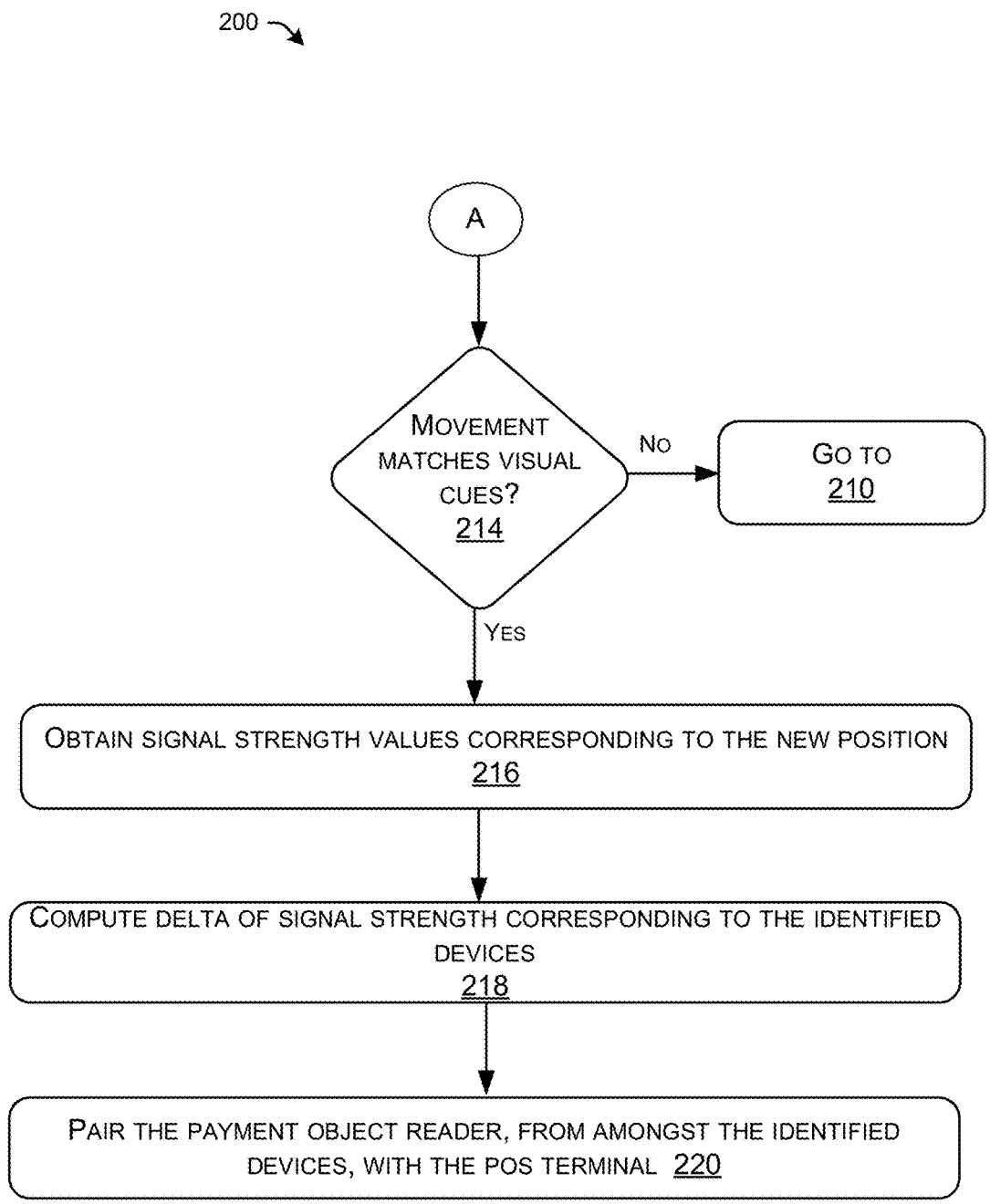

PAIRING A PAYMENT OBJECT READER WITH A POINT-OF-SALE TERMINAL

TECHNICAL FIELD

Generally, a merchant uses a point-of-sale terminal to process a transaction. The terminal is connected, usually with wires, to a cash register and to an Internet connection. Some terminals process chip cards; for such terminals, a card is inserted into the terminal and the user can enter a Personal Identification Number (PIN) on a keypad of the terminal. Other terminals process magnetic stripe cards. For such terminals, the card is swiped through a slot. Mobile card readers are also available for magnetic stripe cards.

Some mobile card readers use cellular technology to communicate wirelessly with a mobile payment application executing on a payment terminal. Some mobile card readers use wireless technology, e.g., Bluetooth®, to communicate with the credit card processor.

Bluetooth uses a process called pairing to allow devices to communicate with each other. Pairing mechanisms include legacy pairing and Secure Simple Pairing (SSP). SSP includes a number of association models for pairing, namely, "just works", "numeric comparison", "passkey entry", and "out of band (OOB)."

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 1B is a data structure illustrating exemplary data tables with signal strength ranges corresponding to readers at various positions, according to an embodiment of the present subject matter.

FIGS. 2A and 2B is a flowchart illustrating the method of enabling and performing Bluetooth communication between the payment object reader and the POS terminal using dynamic signal strength values, according to an exemplary embodiment of the present subject matter.

DETAILED DESCRIPTION

Figure 1A:
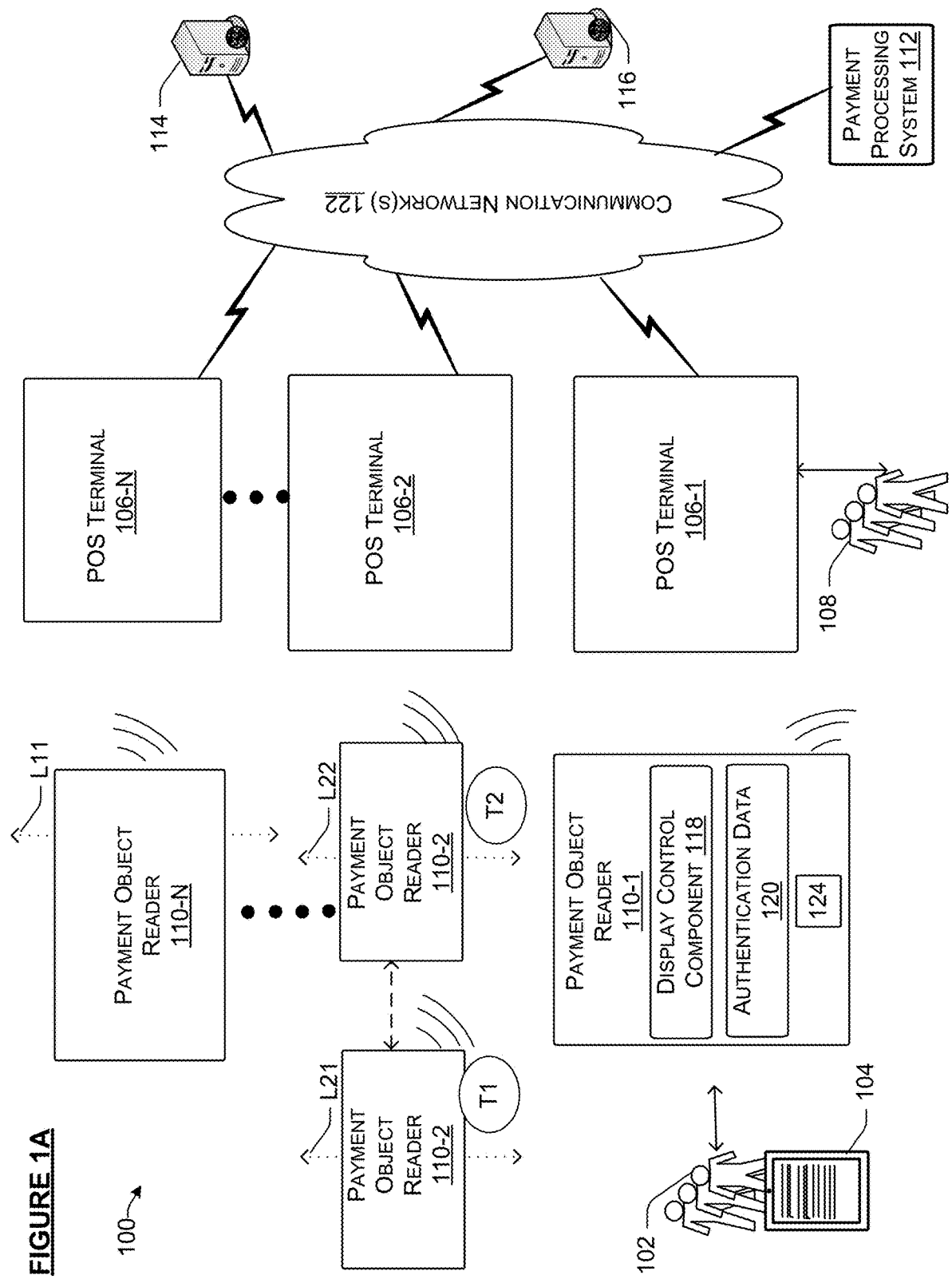
FIG. 1A is a block diagram illustrating an exemplary environment for establishing a communication channel between a computing device, e.g., a point-of-sale (POS) terminal, and a payment object reader to facilitate processing of contact and/or contact-less payment transactions, according to an embodiment of the present subject matter.

Embodiments for pairing a payment object reader with a point-of-sale (POS) terminal ("pairing technology") are described herein. POS terminal is a device, which is usually a combination of software and hardware that allows merchant locations to accept payments for a product or a service; processes the payment transaction for which the payment is made, e.g., by connecting to banks; and facilitates transfer of funds from the banks to furnish the payment transaction. The POS terminal is generally connected to a payment object reader, which can read different kinds of payment objects.

The payment object reader initiates a payment transaction by receiving payment through a payment object. The payment object can be any payment mechanism, for example, a debit card, a credit card, a smart-card conforming to a Europay-MasterCard-Visa ("EMV") standard, a radio frequency identification tag (i.e., near field communication enabled objects), or a virtual payment card stored on a device such as a smart phone and transmittable, for example, via near field communication (NFC). Once connected or paired with the POS terminal, the payment object reader can transmit the data read off the payment object to the POS terminal, which then processes the data to complete a payment transaction for a product or service. The POS terminal can be a mobile device or a desktop device. Mobile devices include smart phones, tablet computers, laptops, or other mobile data processing apparatus. The POS terminal and the payment object reader can be wireless devices, which in the absence of a wired connection have to be paired before sharing information between the two devices.

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired." The pairing mechanism (also known as association models) is the process where the parties involved in the communication exchange their identity information to set up trust and get the encryption keys ready for the future data exchange.

Pairing may include exchange of security features. Once the pairing feature exchange is complete, a temporary security key may be exchanged and the connection is encrypted, for example, using the temporary key. In this encrypted connection, long term encryption keys and/or a digital signature key. The exact keys exchanged are determined by the security features of each device. This really just means that after the pairing features exchange and the connection has been encrypted (these two together are called 'pairing'), and keys have been exchanged, the devices Bonding, on the other hand, is the exchange of long term keys after pairing has occurred. In bonding, the keys are stored and used the next time they connect. Keys can be exchanged using the bonding procedure, but that does not mean they are bonded if the keys are not stored and used the next time. Two devices communicating for the first time go through an initialization phase; such that they become "associated". The link key generation begins when the user enters identical PINS into both devices, which the devices use to generate their secret link keys. One of Bluetooth's security strengths is that in subsequent communications between devices, the link key is never transmitted outside of the device; the link key is simply used in cryptographic algorithms to generate matching sequences.

Generally, the POS terminal through a pairing application obtains identifiers (e.g., registered names or registered number) of all available payment object readers as a list on a display, e.g., using a graphical user interface or display screen, of the POS terminal. The user of the POS terminal, e.g., a merchant, then selects the desired payment object reader by identifying and then selecting the desired payment object reader by its name from the list. The POS terminal and the selected payment object reader then pair to establish communication. But, as contemplated in the present subject matter, the user may not know the name corresponding to a specific payment object reader or its registered number, which is generally a complex set of alphanumeric strings. This is particularly true if there are several payment object readers in proximity to one or several POS terminals. But, pairing of the POS terminal with the right payment object reader ensures that the customer does not pay for someone else's transaction.

Furthermore, the payment object reader includes a processing component to pair with the POS terminal by measuring a value of power level, e.g., power level being received by the radio after the antenna and possible cable loss, expressed in terms of received signal strength indication (RSSI), and comparing the received values with pair with a specific threshold. If the measured value satisfies the threshold value, pairing between the payment object reader and POS terminal is initiated. The threshold value can be satisfied if the measured value is greater than, greater than or equal to, lesser than, lesser than or equal to, and so on. However POS terminals have varying hardware and software configuration and can thus be broadcasting RSSI of varying range of values even though the distance from the payment object reader may be the same. Relying on absolute or universal value of threshold or fixing a distance or touch pairing may not work for pairing in such cases.

As such, in one implementation, a POS terminal, from amongst several POS terminals present at a merchant location, connects with an intended payment object reader, from amongst several payment object readers also present at the merchant location and in proximity to the POS terminals at the merchant location, by connecting with an intended payment object reader based on levels of signal strength in a wireless environment (such as relative received signal strength (RSSI) power values or dBm power values) corresponding to a current or fixed position and/or current time instant, and differential levels of signal strength at multiple positions and time instants. For example, the differential levels of signal strength indicate movement of the payment object reader with respect to the POS terminal. The differential levels can thus further indicate whether the payment object reader is moving towards a specific POS terminal or away from it and with respect to other proximate payment object readers. Additionally or alternatively, the POS terminal can detect movement of the intended payment object reader with respect to the POS terminal based on detection of location and/or motion through location and motion sensors, accelerometers, and the like.

Operationally, the merchant physically moves the payment object reader with which he or she wishes to pair the POS terminal either laterally or longitudinally with respect to the POS terminal. The movement may either be towards POS terminal or away from it. In some implementations, the movement may be random. Each change of position of the payment object reader with respect to the POS terminal generates a unique value of RSSI, which the POS terminal continually tracks. Thus, the POS terminal can detect a reader with varying levels of RSSI. The POS terminal also generates instructions for the reader to be placed at a fixed location. On detecting that the reader has been placed at the recommended location, the POS terminal measures the value corresponding to that location, hereinafter referred to as absolute RSSI value. Accordingly, the POS terminal lists the available reader on the list listing readers in order of varying levels of RSSI and/or absolute value of RSSI.

In the same or alternate embodiment, the POS terminal connects with a payment object reader based on the absolute RSSI levels alone. For example, the POS terminal calibrates the recorded absolute RSSI value or a threshold against which it is compared, based on device characteristics, for example type of the device. For example, for a reader equidistant from two terminals of different types, both terminals measures the absolute RSSI with respect to the device and calibrate RSSI values according to the type of the terminal. The pairing RSSI measured can be calibrated for terminal one using a set of parameters and another set of parameters for terminal two. Alternatively, the pairing RSSI threshold is set at a value A for terminal one and value B for terminal two. Thus, the POS terminal and the payment object reader calibrate RSSI values based on the type of the POS terminal and/or adjust the threshold RSSI.

After manual or automatic selection of the intended payment object reader as per differential levels of RSSI and absolute RSSI value calibrated according to terminal type, the POS terminal may share a password (hereinafter referred to as authentication data, pairing parameter(s), or pairing code interchangeably) with the payment object reader. In one implementation, the POS terminal through a sensor device may capture shared authentication data as visible to it, say as an optical pattern displayed on the desired payment object reader. The payment object reader can transmit alphanumeric authentication data by displaying such data in the form of colors, luminance, intensity, lightness, chroma, and brightness through visual indicators, such as light emitting diodes (LEDs).

Alternatively, a merchant through a user interface of the POS terminal enters the shared authentication data as visible to him and sends the entered information to the payment object reader for confirmation. The payment object reader compares the entered or sensed data with the actual authentication data, and based on the comparison, facilitates pairing or a communication channel to be established with the POS terminal. The channel can be further secured by sharing private security tokens between the payment object reader and the POS terminal through the established communication channel, or alternatively, through a separate channel.

In one implementation, payment object readers and/or POS terminals that implement the present techniques include a signal detection component to detect power signal values with respect to a reader at various time instants and calibrate the detected values according to the type of terminal. The POS terminal includes such components as part of a software implementation. The payment object reader and the POS terminals can also include a display component to convert pairing parameters, such as alphanumeric authentication data for pairing, into "optical authentication data" or "optical pattern," which can be a color code formed by a specific color arrangement or color combination of LEDs. A display control component generates the color code, which is unique to the payment object reader or the POS terminal requesting pairing. Furthermore, the display control component can modify the colors, intensities, brightness, lightness, or luminance of light emitted by the LEDs to provide even more unique possibilities in the way the optical authentication data is displayed through the LEDs. In this manner, the display control component drives the LEDs to either deliver transaction/operational status according to an EMV standard, or to deliver authentication data during a pairing operation. The pairing component can also create and implement rules defining the relationship between the authentication data and an optical authorization data displayed through the arrangement of LEDs and/or sequence of colors emitted by the LEDs. The pairing component may store the rules either locally within the payment object reader or on an external server, such as a payment processing system that can connect with an issuer or acquirer, e.g., a bank, associated with the payment object.

To start the process of pairing the POS terminal with the payment object reader, the broadcasting POS terminal, through a signal detection component, discovers and identifies other broadcasting devices, including the readers in proximity to the POS terminal. Each of the broadcasting readers is emitting a signal whose power can be measured in various ways, for example in terms of RSSI, which is measured by the POS terminal. The reader when moved in a POS terminal defined direction or random direction generates a signal with a new signal strength, which translates into a new RSSI for each new position. The POS terminal tracks the changing levels of RSSI and determines a differential value of RSSI. This along with comparison with a pairing RSSI threshold helps prioritize the reader amongst other readers in neighborhood of the POS terminal.

The POS terminal shows the payment object reader on a list of devices available in its network, the readers arranged in order of the reader most likely to be paired. The likelihood being determined on differential and absolute levels of RSSI. When selected, the desired payment object reader emits through the LEDs, a visual pattern of colors indicative or representative of the authentication data. A user of the POS terminal can inspect the visual pattern and manually enter the as-inspected pattern on a display screen of the POS terminal. The POS terminal can also capture an image of the visual pattern through a camera or any such sensor device. A POS pairing component of the POS terminal sends the inspected or captured data to a pairing component of the desired payment object reader, which compares the incoming data with the visual pattern. If there is a match, the payment object reader establishes a communication channel to connect the POS terminal with the payment object reader, the channel allows the merchant operating the POS terminal to accept any payment object from the customer and transfer data read off the payment object by the payment object reader to the payment processing system. The payment processing system receives the payment object data and causes funds to be transferred from a financial account of the customer to a financial account of the merchant. Thus, as described above, by taking existing hardware and software used for displaying the status of a financial transaction, and repurposing it to be used for pairing purposes, display-less payment object readers can be paired with any POS terminal.

In contrast to the disclosed pairing technology, traditional methods need to identify a desired payment object reader prior to pairing, and the merchant operating the POS terminal must physically select the desired reader through a graphical user interface of the POS terminal via keypad. The payment object reader identifier however is generally a complex string of characters. While indicative of the desired reader, the identifier is not easily distinguishable, making it difficult for the merchant to quickly and easily identify a specific reader and/or connect to the desired reader without much trial-and-error. It is also desirable to automatically connect to the correct reader and avoid risks associated with sharing secure information with an undesired reader. Furthermore, the POS terminals can be made of any software or hardware configuration, and as such models based solely on a single value of threshold RSSI fail to work with all device types. Furthermore, some payment object readers may not even have an interface or display for output or a keyboard for numeric input or an alternative communications medium to facilitate trust exchange.

To this end, the pairing technology described herein alleviates at least the problems identified above by providing the technology to replace or supplement the complex identifier information with motion-based pairing technology. The pairing technology may find various applications in, e.g., contact and contactless POS systems and scenarios. In one example scenario, the pairing technology may be used in applications where employees of a merchant are handling multiple payment object readers. The merchant or an owner of a store can provide managerial assistance by pairing with any reader through the pairing techniques described herein. The merchant can also monitor the activity on a specific reader with which it is paired. In another scenario, the merchant can provide support to a reader experiencing heavy traffic, e.g., by monitoring the activity on a paired reader and routing orders for items and services via merchant's terminal from the paired reader to another paired payment object reader, which is less crowded than the current paired payment object reader.

The pairing technology can also be configured to operate irrespective of the kind of payment object reader, POS terminal, web applications, mobile applications, POS topologies, payment cards, computer networks, and environments. The pairing technology described herein can pair a payment object reader to the POS terminal in both real-time and offline modes. Furthermore, even though Bluetooth or Bluetooth Low Energy has been used to describe certain embodiments, other wireless protocols, such as NFC, Wi-Fi, etc., can also be used.

The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

As used herein, RSSI, or "Received Signal Strength Indicator", is a measurement of how well the POS terminal can detect a signal from an access point or router, such as Wi-Fi card of the payment object reader. RSSI is a term used to measure the relative strength of a received radio signal to the POS terminal. The IEEE 802.11 standard specifies that RSSI can be on a scale of 0 to up to 255 and that each chipset manufacturer can define their own "RSSI_Max" value. Cisco, for example, uses a 0-100 scale, while Atheros uses 0-60. The higher the RSSI value is, the better the signal is. While RSSI is relative signal strength, the implementations described herein can also measure absolute values, for example, dBm, which represents power levels in mW (milliwatts).

In some implementations, transmitted instead of received power levels are used. In yet another implementations, other forms of signal measurements or identifiers, for example, in other frequency bands, to identify and pair with a reader.

Even though some implementations describe the POS terminal measuring values of RSSI of neighboring devices, in some implementation, the reader may measure values and pair with an appropriate device from amongst neighboring devices. Furthermore, some implementations describe the readers being moved with a fixed terminal, in other implementations, the terminal may be moving and the reader is fixed. In yet other implementations, both the reader and the terminal may be moving either towards or away from each other.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

Additionally, as used herein, the term "payment card," "payment object," or "payment instrument" refers to a payment mechanism that includes a debit card, a credit card, a prepaid gift card, or the like, a smartcard that has an embedded integrated circuit chip (e.g., Europay-MasterCard-Visa (EMV) card), a proxy card, or any card that functions as a combination of any of these mechanisms. The term "proxy object" as used herein refers to a card that may or may not bear a card number/account number that appears to be that of a real credit or debit card account (i.e., it is in the correct format), but where that card/account number is actually only a proxy for the customer's real card/account number. Another type of payment object is a biometrically identifiable instrument, which may be initialized using a person's finger (e.g., for fingerprint recognition), face, iris or retina, heartbeat, etc.

Alternatively, the payment object can be a software instrument or virtual instrument, such as a virtual wallet configured to initiate contactless payment transactions, e.g., a key fob, a mobile device having an RFID tag, etc. Other examples of payment object may also include a prepaid card, a gift card, a rewards card, a loyalty points card, a frequent flyer miles card, checks, cash, or in general, any kind of financial instrument that holds financial value or provides a promise to pay at a later time. Thus, a payment object transaction (also referred to as payment card transaction) may be any be a transaction where a merchant or a user swipes the user's credit card through a payment object reader in exchange for a product or service offered by the merchant.

The term "swipe" here refers to any manner of triggering a payment object reader to read data from a payment object, such as by dipping into, tapping, hovering, bringing in close contact or passing the payment object into or through a payment object reader.

The term "broadcasting" refers to the modes of operation of the Bluetooth enabled device to enable connection with neighboring devices and can be either discoverable mode or advertising mode. Discoverable mode is a state within Bluetooth technology integrated devices that enables Bluetooth devices to search, connect and transfer data with each other. Discoverable mode is used to propagate the availability of a Bluetooth device and to establish a connection with another device. In some cases, the device can also be in the "non-discoverable" mode, which prevents devices from being listed during a Bluetooth device search process. However, a non-discoverable Bluetooth device is visible to devices that know its address or can discover its address.

The term "advertising" is meant to refer to another mode of operation of the Bluetooth enabled device. Both broadcasting and advertising help initiate, establish, and manage the connection with other devices. If the device just needs to communicate the status of a few parameters or alarms and does not absolutely require acknowledgement from other side, the BLE advertising mode may do the job with just a few commands sent to the BLE controller. When advertising mode is enabled, the BLE device will start to transmit special packets carrying advertising information as Payload Data Units (PDU) on the RF channels dedicated for this purpose. BLE is utilizing a common structure of over the air packets for advertising and data channels. An advertising channel PDU has a header and actual payload. The header contains information about the size of the payload and its type: advertising channels are used for exchanging information before making a connection between devices. Hence, different payload types are supported to broadcast information about the device's ability (on inability) to support a connection, to request more information or to respond with additional device information and to request the initiation of a data connection with another device.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The pairing technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

Turning now to the Figures, FIG. 1A illustrates an exemplary environment 100 for establishing a communication channel between a computing device, e.g., POS terminal 106-1, and a payment object reader 110-1 to facilitate processing of contact and/or contact-less payment transactions, according to an embodiment of the present subject matter. A payment transaction can include reading payment data off payment objects 104, for example, credit cards, debit cards, gift cards, drivers license cards, identification cards, or in general, any object with financial information stored thereon or connected to financial information stored on an external server.

A customer(s) 102 provides the payment object 104 to pay for a product or service offered by a merchant 108. The merchant 108 introduces (swipes, taps, dips, inserts, or otherwise brings in proximity) the payment object 104 in any one of the payment object readers 110-1, 110-2, . . . , 110-N(collectively referred to as payment object reader(s) 110), which are or can be wirelessly connected to at least one of the POS terminals 106-1, 106-2, . . . 106-N(collectively referred to as POS terminal 106) at a merchant location(s) to process the transactions for which the payment object is introduced. The POS terminal and the payment object reader are separate entities and require connection to send and receive information between each other and thus embodiments hereinafter describe the process of pairing or establishing connection between the POS terminal and the payment object reader. In case of multiple readers and POS terminals, conventional methods relying on the list showing discoverable readers can be confusing and useless if the user does not know what identifier on the list corresponds to which reader. To this end, the POS terminal generates a list as per the present subject matter that is in tune with which device a user wishes to pair with based on detected movement of the intended payment object reader and pairing power threshold levels calibrated according to the POS terminal. This is described subsequently.

The POS terminal 106 can be a mobile device or a desktop device. Mobile devices include smart phones, tablet computers, laptops, or other mobile data processing apparatus. In one implementation, the POS terminal 106 can be a POS terminal operated and managed by a merchant(s) 108. Furthermore, the POS terminal 106 can be of a varied hardware and/or software configuration, such that POS terminal 104-1 may be an Android device whereas POS terminal 104-2 may be an iOS device. In another example, POS terminal 104-1 can be a cellphone whereas the POS terminal 104-1 can be a tablet computer. Since the POS terminal 104 can have varying hardware and software configurations, the dissipated and detected power levels can differ, such that for the POS terminals 104 at the same distance from a reader, one terminal matches the pairing RSSI threshold while the other distance. However, this is not preferred. To this end, the POS terminal 104 can calibrate the RSSI based on its own type. For example, if the POS terminal 104 is an Android device and has an RSSI value of 200, the POS terminal calibrates it to be 350, meanwhile the Apple device has an RSSI value of 350. These are only examples and actual values may differ.

The payment object reader 110 can process payment objects 104 having magnetic stripe cards or smart chip cards. Smart chip cards can be processed according to the Europay, MasterCard, Visa (EMV) protocol. In some implementations, the payment object reader 110 processes cards using Near Field Communication (NFC) hardware and the NFC protocol. Thus, the payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain payment transaction data off a payment object 104.

The payment object reader 110 implements one or more mechanisms to capture data from and off the payment objects 104 and to communicate the captured data (hereinafter referred to as "payment object read-data" or "read-data") wirelessly to the POS terminal 106. For example, the payment object reader 110 may include hardware features, such as slots, magnetic tracks, and rails with one or more sensors or electrical contacts to facilitate detection and acceptance of a payment object 104. In some cases, to allow exchange of data, such as read-data, the POS terminal 106 connects to a specific payment object reader, e.g., payment object reader 110-1 from amongst a plurality of payment object readers 110, over wireless local area network or shorter range wireless communication network, and can occur in many forms, for example, Bluetooth, Bluetooth Low Energy, Wi-Fi, NFC, etc. To allow this, both the POS terminal 106 and the payment object reader 110 include transceivers and antenna (not shown in this figure). Once connected, the payment object reader 110 can then broadcast data to the POS terminal 106 and vice-versa through the established channel. In some implementations, the payment object reader 110 and the POS terminal 106 undergo a pairing process before establishing communication to verify a source and destination for data transfer, as described below.

Bluetooth pairing can be done by "device association," "device identification," or "device pairing" of between Bluetooth enabled devices (e.g., the POS terminal 106 and payment object reader 110 having Bluetooth communication capabilities), over short distances via radio wave transmission. Devices can be associated, i.e., identified, connected and paired together by first exchanging a public password (hereinafter referred to as pair communication data or authentication data) wirelessly, to enable the subject wireless devices to trust each other, prior to establishing secure and interactive sessions conducted via open Bluetooth wireless radio communications. The authentication data may be authentication code, PIN code, "Bluetooth Device Address", "Simple Pairing Hash C" or "Simple Pairing Randomizer R," for example. As shown in the figure, radio signals indicate devices enabled to communicate with other devices via Bluetooth or BLE.

The traditional pairing techniques identify the payment object reader(s) 110 with which the POS terminal 106 is to be paired based on name or other visual identification. Contrary to that, following paragraphs describe systems and/or methods for selecting a payment object reader 110 from amongst a number of readers based on measured RSSI power levels—both differential or dyanmic RSSI values and absolute, the absolute RSSI values being calibrated as per type of POS terminal 106. In one example, to allow the customer 102 to interact with a POS terminal 106 through a desired payment object reader 110, the POS terminal 106 "discovers" the payment object readers 110 in its vicinity and presents, through a "discovery" option on a web, cloud, or mobile application executing on the POS terminal, a list of neighboring payment object readers 110. The discovery area may be limited or a geo-fence may be set based on communication technology or merchant preferences. As part of discovery, the POS terminal 106 may send inquiry messages on a periodic basis in an attempt to find another Bluetooth-enabled device, such as the payment object reader 110-1. For that, the payment object reader 110-1 wishing to be "discovered" periodically turns on its transceiver and detects such inquiry messages or measures RSSI levels. The POS terminal lists the available devices in order of differential and optionally, based on absolute RSSI. The differential RSSI values are generated and detected corresponding to a moving reader with respect to the POS terminal. The other readers and the POS terminals that are fixed and are not moving are low on the priority list. The merchant 108 then selects the desired payment object reader 110-1 from amongst the available payment object readers 110 displayed on the list of devices available for pairing. For example, the payment object reader 110-1 moving with respect to the POS terminal 106-1 generates a specific differential and absolute RSSI value owing to its movement and is therefore first on the priority list.

As disclosed herein, the discovery process in one implementation initiates determination of RSSI power levels as received from the different readers 110 in the vicinity. The pairing of the devices, such as the POS terminal 110 and the payment object reader 106, can be based on measured RSSI for readers or POS terminals, when either or both are in relative motion, and determination of differential or dynamic RSSI. The payment object readers 110 can be located at various locations in proximity to the POS terminal 106 with which they wish to connect. For example, payment object reader 110-1 can be at location L11 with respect to POS terminal 106-1; payment object reader 110-1 can be at location L21 with respect to POS terminal 106-1; and payment object reader 110-1 can be at location LN1 with respect to POS terminal 106-1. Similarly, payment object reader 110-1 can be at location L12 with respect to POS terminal 106-2; payment object reader 110-2 can be at location L22 with respect to POS terminal 106-2; and payment object reader 110-N can be at location LN2 with respect to POS terminal 106-2. Therefore, at a time instant $T_1$, the location nomenclature Lxy defines the location of the payment object reader x with respect to POS terminal y. At time instant $T_2$, the merchant may cause the Lxy values to change, for example, if the merchant 108 physically moves the reader 110 or the POS terminal 106 away from or toward each other. As the readers or the POS terminals are physically moved with respect to each other, the POS terminal (for example POS terminal 106-1) captures RSSI values corresponding to different locations. In one implementation, the POS terminal computes a dynamic RSSI value based on the various RSSI values obtained. For example, the POS terminal can select a delta or difference of RSSI values based on maximum or minimum RSSI value, or the last two values to compute dynamic RSSI. In another implementation, the POS terminal 106-1 can compute dynamic RSSI based on an average, mean, mode or median of values. Furthermore, some values may be weighted more than the others. In one implementation, the POS terminal 106-1 can also track the range or distribution of values, where each value corresponding to a different distance between the POS terminal and the reader. In some implementations, the POS terminal uses the range of values on which to implement probabilistic, stochastic, or deterministic statistical models. Accordingly, the POS terminal can characterize a reader as "in motion," and therefore, intended to be paired from amongst others. As a secondary or additional verification, the POS terminal can also verify authentication data or device identifier.

In some cases, there may be several readers and POS terminals moving at the same time instant either toward or away from each other. As a result, a particular POS terminal and/or payment object reader that is wishing to pair can see several values of dynamic RSSI corresponding to different combinations of reader and terminals. To this end, the POS terminal can generate visual cues to cause a specific reader to be positioned in a certain direction. The positioning of the reader in the specified direction yields a predetermined RSSI, which the POS terminal uses to correctly identify from amongst several other devices in proximity.

In some implementations, the devices can be identified and paired or authenticated based on the dynamic RSSI and its comparison with a threshold. For example, the POS terminal 106 can be paired to a payment object reader 110 exhibiting a threshold or predefined received signal strength indicator (RSSI) level, which may vary based on the type of device that the POS terminal is, this value is hereinafter referred to as absolute RSSI values. Thus, the threshold RSSI can be 600-700 units for an iPad 106 and 400-500 units for an Android device. In some cases, the RSSI level is indicative of how close or far the payment object reader 110 is to the POS terminal 106. In other words, to pair a payment object reader, the merchant 108 may bring the reader or the POS terminal 106 within a predefined distance, e.g., from the POS terminal 106 or reader respectively. The POS terminal 106 directs the merchant to bring the reader closer or further away based on its threshold RSSI. In this manner, the POS terminal 106 can determine, with reasonable certainty, identification details of the reader with which it wishes to pair. Thus, in some cases, the POS terminal 106 can be paired to the payment object reader 110 having the highest RSSI. In some other cases, the RSSI level can be fixed based on specification of the payment object reader 110, version number, etc. In one implementation, the devices, for example, the POS terminal 106 can be automatically paired to a proximate payment object reader 110 having a specific RSSI. This technique is referred to as signal strength-based technique hereinafter and is explained in detail with reference to FIGS. 2A-2B and 4A-4B.

Even though the exemplary implementation shows comparison logic to be residing in the POS terminal, the comparison logic can also reside in the payment object reader, or in a separate device in proximity to both the POS terminal and the payment object reader. This is discussed in subsequent figures.

In one implementation, to pair the POS terminal, for example POS terminal 106-1 with the payment object reader 110-1 using Bluetooth technology, the POS terminal 106 generates instructions to enable the pairing mode on the reader and to move the reader in various directions. Alternatively, the movement of the reader can trigger the POS terminal to open an interface on the POS terminal to initiate pairing process. The POS terminal lists all the readers in the order of dynamic RSSI obtained from motion of the readers at various time instants, and optionally, the absolute RSSI values as per POS terminal type. The POS terminal 106 then requests the payment object reader 110 to share the authentication data with the POS terminal 106. The requesting device (e.g., the POS terminal 106) can be asked to confirm the authentication data being displayed on a display screen of the source device, i.e., the payment object reader 110. Alternatively, the POS terminal 106 can enter or select the name or any such reader identifier on the interface displayed on the POS terminal 106. For example, the name or such reader identifier can be engraved or printed on a surface of the payment object reader 106.

In some cases, the payment object reader 110 can be smaller, lighter and simpler than readers having integrated keypads or displays. For example, the payment object reader 110 need not include a keypad, a display, an interface for receiving signatures, e.g., a touch screen display, or a cellular connection to a payment processing system on an external network, e.g., the Internet. Through these omissions, the conventional means of pairing, which display the authentication data on a display, are not available. The payment object reader 110, however, includes one or more visual indicators, such as light emitting diodes 124, which can emit light in various colors, intensities, lightness, luminance, and brightness.

Such LEDs 124 are normally included with the payment object reader 110 to be in compliance with the EMV protocol. The EMV protocol mandates the standardization of the electronic payment procedure through two levels of type approval: EMV1 for the hardware and the logical interfaces, and EMV2 for the applications and their features. Thus, the LEDs 124, as per EMV protocol, indicate the operational status of the payment transaction or device. For example, a green LED may be used to indicate successful transaction, while red LED might indicate a failed transaction, and a yellow LED might indicate processing of a transaction. As disclosed herein, the existing LEDs 124 configured to indicate the transaction or operational status are harvested to transmit authentication data, according to some implementations. It will be understood, however, that additional or a separate set of LEDs may be installed specifically for pairing purposes.

Based on the foregoing discussion, following methods and systems described herein provide ways to pair devices by establishing a connection and further securing the established connection between the paired devices, regardless of whether the paired devices include an interface for transmitting data through audio, video or tactile mechanisms.

In one implementation, the devices, for example, the POS terminal 106 can be paired to a desired payment object reader 110 using authentication data which can be transmitted through the visual indicators, such as LEDs 124 provided on the payment object reader 110. To do so, the payment object reader 110 converts the authentication data into an optical code, or into any format that is understood by the LEDs 124. This technique is referred to as LED-based technique hereinafter.

For example, a display control component 118 in the payment object reader 110 is configured to convert the authentication data into a specific sequence, color, or animation corresponding to specific alphanumeric data value (the converted data is referred to as optical authentication data 120 hereinafter). In some cases, the authentication data may be dynamic and changing with time. To this end, the display control component 118 can also change colors, chroma, brightness, luminance, lightness, etc., or their sequence, dynamically as the authentication data varies.

The display control component 118 then sends appropriate signals to the LED 124 to emit light as per the optical authentication data 120, for example, by using a specific arrangement or color combinations of LEDs. Besides authentication data, the display control component 118 can also control the LEDs 124 to convert and transmit other kinds of data by modifying the brightness, intensities, lightness, and luminance and color combinations of the LEDs 124. In one implementation, a cluster of red, green, and/or blue LEDs 124 are used to blend light and produce new, collective colors. In this way, several colored LEDs may be combined to cause flexible light sources to respond and change based on user or sensor input. While some implementations focus on color's subtractive property (absorbing some wavelengths and reflecting others), some rely on the additive properties or color mixing. Color mixing relates to when red, green, and blue light—the relative colors for which the chromaticity-sensitive cones in the human retina tend to show an affinity—are combined in equal portions, they produce white light. Changing the relative luminance of any of the three primary light sources results in a change of the combined color of light produced and perceived, and, therefore, conceptually repositions the perceived light's color on the color space. For color mixing, the payment object reader 110 includes a specific cluster of LEDs 124 driven by color-specific LED drivers (not shown). The drivers vary the duty cycle of one color set of LEDs 124 to produce changes in that color set's luminance (or the chromaticity), thereby affecting the resultant perceived color that the cluster produces.

It will be understood that even though LEDs 124 are chosen as visual indicators due to associated long life expectancy, fast switching, high tolerance to humidity, low power consumption and minimal heat generation, other kinds of light sources, such as than incandescent lights, can also be implemented. Once paired, the established communication channel can be further secured using ways similar to the device association or pairing, i.e., the LED or signal strength based pairing processes.

For example, the POS terminal 106 detects a known alias or proxy address on the list, where the alias corresponds to payment object reader 110-1. The alias may be mapped to a factory-assigned Bluetooth network ID/name or a device registration number associated with the payment object reader 110 in a look-up table. Thus, when the merchant 108 selects the known and unique proxy address, for example from a list of unique proxy addresses presented on a user interface of the POS terminal 106 as a result of the discovery, the POS terminal 106 accesses a look-up table stored either locally on the payment object reader 110 or the POS terminal 106 or any other remote server. Based on the information in the look-up table, the POS terminal 106 generates and sends inquiry messages to the specific payment object reader 110-1. Once an inquiry message is received and approved, the receiving device, e.g., payment object reader 110-1, can send an inquiry response packet (message) containing, among other things, its authentication keys or other pair information data for establishing and securing the connection between the POS terminal 106 and the desired payment object reader 110. As described before, the authentication keys may be shared through, for example, either LED based or signal strength based techniques. Once a communication channel is established and relevant devices are paired, the two devices can exchange secure information with each other.

For example, after a desired payment object reader 110 is paired and secured with the POS terminal 106, the payment object reader 110 and the POS terminal 106 can exchange additional data, e.g., the payment object reader 110 can transmit read-data off the payment objects 104 to process a transaction for a product or service. In an exemplary use-case scenario, the user 102 interested in purchasing an item from the merchant 108 presents the payment object 104 in contact or in a detectable field around the payment object reader 110 to allow the merchant to obtain payment object information (e.g., credit card number, CVV, etc.) from the payment object 104. It is assumed that the payment object reader 110 is configured to receive a payment object 104 or payment object information to process payment transactions (i.e., those involving reading of physical payment object provided by the user at the merchant's location), as well as card-not-present (CNP) transactions (i.e., those where the payment object 104, such as a credit card, is not physically presented at the time that the payment is effected). Examples of card-not-present transactions include transactions involving virtual cards or wallets having financial information stored thereon.

For a payment transaction using a payment object 104, such as a magnetic stripe card, the card can be swiped at the payment object reader 110. The payment object reader 110 sends card data of the magnetic stripe card to the POS terminal 106, for example using an antenna. The POS terminal 106 can be waiting to receive card data from the payment object reader 110, e.g., by scanning for Bluetooth data broadcasts.

For a payment transaction using a payment object 104, such as a smart chip card, the card can be inserted to the payment object reader 110 so that the reader engages electrical contacts for a microchip on the card. The payment object reader 110 sends a PIN request to the POS terminal 106 using the antenna. The POS terminal 106 receives a PIN from the user 102, e.g., entered through a user interface on or connected to the POS terminal 106, and sends the PIN to the payment object reader 110 for confirmation, e.g., wirelessly. The payment object reader 110 sends the PIN to the card, which contains a chip with an embedded PIN. The card compares the received PIN to the embedded PIN. If the PINs match, the card sends a confirmation to the payment object reader 110, which sends the confirmation to the POS terminal 106 wirelessly.

After receiving data, e.g., card data or a confirmation, from either the magnetic stripe card or the smart chip card, the POS terminal 106 can transmit the payment object information to a payment processing system 112 ("PPS 112"); one or more bank computing device(s) 114; and a card payment network computing device(s) 116, e.g., by using an external network such as the network 122, to validate the information and transfer the funds from the user's financial account into the merchant's financial account. The card payment network computing device(s) 116 can communicate the approval or denial to the PPS 112, which can relay the card issuer's approval or denial to the POS terminal 106.

When the transfer of the funds is successful, the transaction is assumed to be processed or completed. Accordingly, a receipt is generated for the user to indicate completion of transaction and details of transaction as proof of purchase.

Similar to the connection between the payment object reader 110 and the POS terminal 106, other devices may also be connected. For example, when the owner or user 102 of a mobile phone serving as payment object 104 enters a store having the payment object reader 110 connected as a point of sale terminal, he or she gets in the BLE or NFC network radius of the payment object reader 110. The connection between the payment object reader 110 and a user device may also be established in the manner described herein. Payment object reader 110 then serves as a bidirectional conduit for the customer 102 to communicate with the POS terminal 106 collecting or handling the credit card transaction.

It bears mentioning that after one instance of successful communication of data, the receiving payment object reader 110-1 (i.e., the device with which the POS terminal 106 paired) may be added to a list of trusted devices. Any future connections with the trusted devices may happen automatically without user intervention or re-executing any of the explicit pairing techniques described above.

FIG. 1B is a data structure 150 illustrating an exemplary implementation to allocate and map device types with RSSI ranges or values that are acceptable for pairing, according to an embodiment of the present subject matter. In one implementation, the POS terminal 106 can obtain, generate and/or locally store the data structures or schemas. In some implementations, the POS terminal 106 can obtain the data structure 150 from the payment processing system (PPS) 112, which stores the data structure 150 in database 154. In one example, the data-structure can be a schema showing relationship between RSSI values or ranges and type of POS terminal. The device type can be defined based on hardware or software specifications. The PPS 112, e.g., through the signal strength component, detects characteristics of devices in a location where the merchant is performing transactions. The devices can be characterized by examples that include but are not limited to: physical features, mechanical and operational differences, timing parameters, radiated performance, wireless performance, quality of communication links, radio frequency response, transmission measurements, receiver measurements, and engineering tolerances, hardware imperfections inherent to analog components of the device, radio frequency response to certain signals, and the like, which make it unique with respect to another seemingly similar device. Such device characteristics can be used for device identification or fingerprinting, and are in some ways manifestation of an individual's identity and can therefore be used verification and authorization of a method of payment that requests a buyer to confirm his or her identity.

Accordingly, the PPS 112 determines a threshold RSSI value for each of the devices based on the database schema 150 or lookup table. The PPS 112 assigns the RSSI value to the various devices, including the payment object reader 110 and POS terminal 106. The system includes mapping logic, cooperating with the database schema 150, to map the string to the database to find the most likely content items corresponding to the incremental entries. The mapping logic operates in accordance with a defined RSSI selection model, and the RSSI selection model corresponds to the known RSSI values with respect to the device type. The system also includes presentation logic that orders the most likely values identified by the mapping logic and presents on a display device the most likely RSSI values in accordance with defined ordering criteria. Such RSSI values can change in real-time based on changing device characteristics. The data structure can be tree data structure or hash tables or the like.

The structure 150 is divided into a plurality of data blocks 152A-N. In one example, the POS terminal 106-1, which may be an iPad®, has associated with it an absolute pairing RSSI threshold value of 450 or a range of 400-500 units. Absolute pairing threshold may be defined as the range of values expected for the POS terminal and reader combination. The POS terminals may vary in form and shape from another. As such, the range is customized to the POS terminal. In one example, the POS terminal threshold range is calculated for different terminals equidistant from the reader, the distance is hereinafter referred to as LA. The POS terminal 106-2 can be an Android tablet and has associated with it an absolute RSSI value range of 501 and 600. The POS terminal 106-N can be an iPhone and has associated with it an RSSI value range of 801-900.

The POS terminal measures the RSSI levels at various locations. For example the levels can increase or decrease depending on where the readers are located, for example when the reader 106-2 is at location L21, L22, and L2N, respectively with respect to POS terminal 106-1, POS terminal 106-2, and POS terminal 106-N, the RSSI value ranges can differ as shown. As the desired reader and the POS terminal move with respect to each other, the RSSI values begin to change and are reflected corresponding to the new location at a new time instant. In this example, assume that L1<L2<LA<L3. Accordingly, the differential RSSI values can also be generated, which correspond to dynamic RSSI. Such data-structures can be generated for each of the readers. In another implementation, the data structures can be created for each broadcasting device, including the POS terminals.

As shown in the exemplary data structure 150, the data block 152A corresponds to the varying values of RSSI levels as a result of relative movement between POS terminal 106-1 and the reader 110-1. The data block 152A corresponds to the different RSSI values as detected at various locations of the reader, such as L2, L3, L1 and so on. The data block 152E shows the differential value of RSSI levels coupled with the absolute value of RSSI, which matches the set threshold for that device. The data block 152E corresponds to delta RSSI computed from the recorded values at previous time instants or locations. The delta RSSI can be a subtraction, average or other complex function of the previously recorded values. The data block 152D records the absolute value of RSSI when the reader is placed at location LA. For the same location LA, the POS terminal yields a value within the RSSI threshold range. In some cases, the absolute values are not checked and only the differential values are matched to a threshold, which may or may not be the same as the absolute threshold value or range.

Figure 2A:
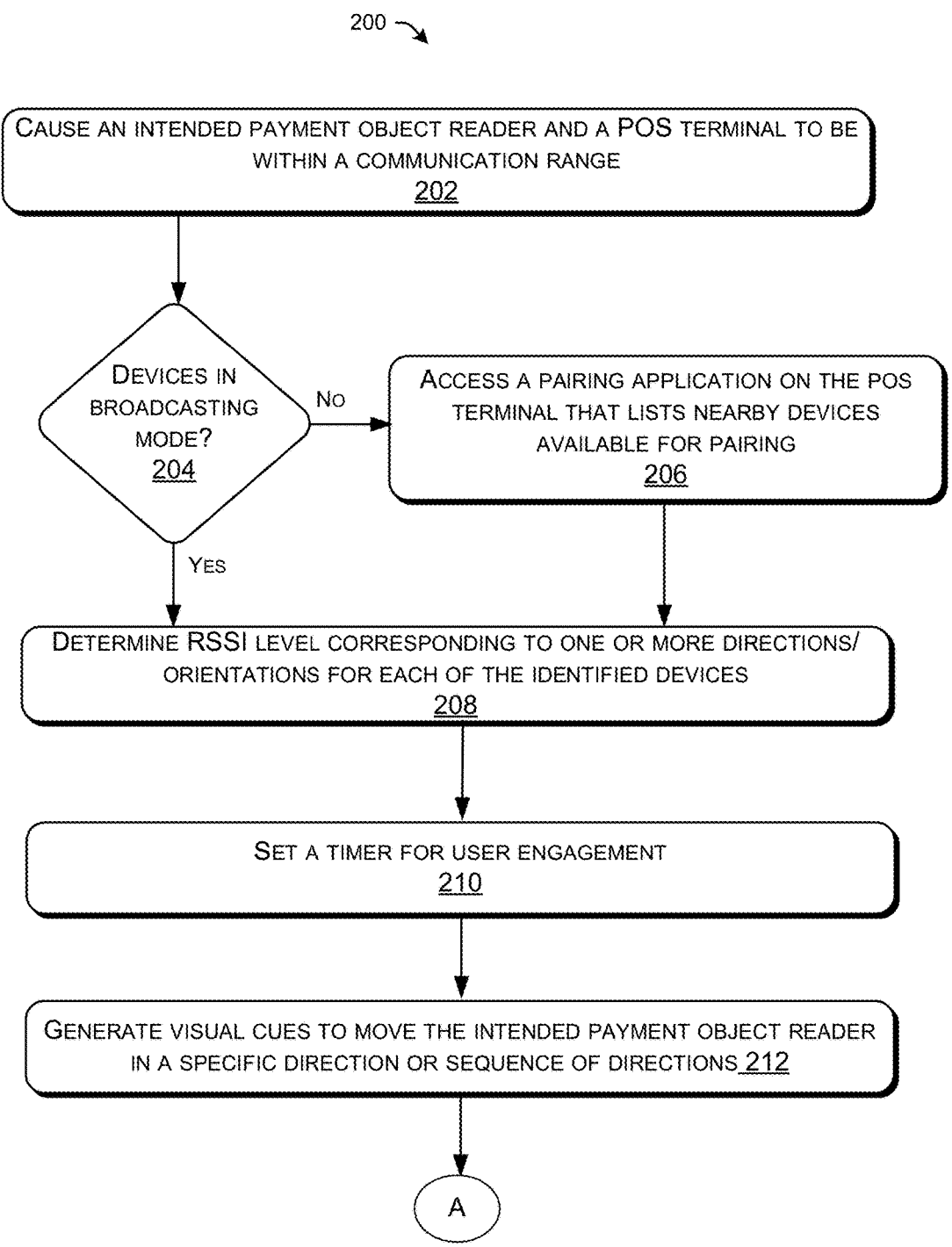

FIGS. 2A and 2B is a flowchart illustrating the method of pairing two devices, according to an embodiment of the present subject matter. For convenience, the process 200 is described as performed using a mobile computing device, e.g., the POS terminal 106 from amongst several terminals in the vicinity, and a payment object reader, e.g., the payment object reader 110-1 from amongst several readers in the vicinity of the POS terminal at a merchant's location. In the example flowchart below, the POS terminal is shown to implement the mechanism to discover and authenticate a payment object reader from amongst several readers available proximate to the POS terminal. In other implementations, the logic to discover and authenticate can be implemented in the readers or in a device central to both the reader and the POS terminal.

To initiate pairing, a user, e.g., a merchant 108, brings the desired payment object reader and the POS terminal within a certain communication range of each other. The range is limited by the technical specifications of the short-range wireless communication network used for pairing. For example, the RF or Bluetooth specifications define the range as 10 meters within which two devices can establish communication (step 202).

At step 204, the POS terminal determines whether the devices, including the desired payment object reader 110-1, are in broadcasting mode—either discoverable or advertising. For example, Bluetooth devices use the advertising procedure and scanning procedure to discover nearby devices, to be discovered by devices in a given area, or to form a connection with another Bluetooth device. The discovery procedure and connection procedure are both asymmetrical. A first Bluetooth device needs to listen for devices advertising scannable or connectable advertising events, while another Bluetooth device is actively broadcasting scannable or connectable advertising events over the advertising broadcast physical channel.

If the reader and/or the POS terminal are in the broadcasting mode, the flow transitions to step 208. However, if the reader and/or the POS terminal are not in the broadcasting mode, the user accesses a pairing application in the POS terminal and the pairing button on the payment object reader (step 206). Depending on technique used, the POS terminal identifies the intended payment object reader when a user has enabled the broadcasting or pairing mode by performing the requested actions (e.g., inputting a code or name, or clicking the pairing button as instructed) on both the POS terminal and the payment object reader. As mentioned before, in some cases, the payment object reader and the POS terminal are always set in broadcasting mode and thus do not need to specifically enable a pairing mode as described in step 204. The pairing application or pairing button or the like triggers the broadcasting mode.

At step 208, when the payment object reader 110 is in broadcasting mode, the POS terminal 106 can search for and locate the payment object reader 110, including the one with which the merchant 108 wishes to interact. As part of the discovery phase, the POS terminal 106 can access an identifier associated with the payment object reader 110 that identifies the alias of the payment object reader 110, model of the payment object reader 110, and a version or registration number, e.g., a firmware version number, of the payment object reader 110, along with several other payment object readers in proximity to the POS terminal 106. Additionally, the order of the payment object readers (or other devices) on the list is generally based on location from the POS terminal or past connections and stored as favorites. However, the merchant may wish to connect with another reader that is equidistant from the POS terminal or further away, and therefore such list is not always an accurate representation of merchant preferences. To this end, the POS terminal can re-order the readers based on detected movement of the readers, making the selection of the desired reader more intuitive. This is explained through the method steps explained hereinafter.

At step 210, the POS terminal 106 sets a timer value within which the POS terminals tracks user engagement in terms of movement of the POS reader as per visual cues. In one implementation, the timer starts only after the user has agreed to accept the visual cues. The timer can be a countdown timer in a corner of the interface displaying the cues. The POS terminal 106 partitions the timer value into periodic or random time instants.

At step 212, the POS terminal generates visual cues within the set timer and at time instants to move the intended payment object reader in a specific direction or a sequence of directions, for example in a specific shape at each time instant and to complete the motion within a predetermined time. In other implementations, the POS terminal can generate cues to move the reader in a random direction or directions. The cues can be on a graphical user interface of the POS terminal. The POS terminal 106 generates directions for the user to move the intended payment object reader to a new position through visual, or other tactile means. In some implementations, the POS terminal tracks RSSI values at random or set time instants without generating visual cues. For example, a user may move the reader in random directions, while the POS terminal tracks the various RSSI values at different locations for subsequent processing.

At step 214, the POS terminal confirms that the movement of the payment object reader matches the direction indicated by the visual cues. On determining correct movement, the flow transitions to step 216. In case the movement is incorrectly followed, the directions are either re-generated as in step 212 or the process resets the timer value at 210.

At step 216, the POS terminal obtains RSSI values from neighboring and discovered devices at each time instant, including the reader that is being moved relative to the POS terminal. The POS terminal tracks the RSSI values of other broadcasting devices, such as readers and terminals, as well. The POS terminal obtains power levels, for example in terms of RSSI or dBm, and corresponding to each location of the reader with respect to the POS terminal, including the desired payment object reader 110 at the time instants. The movement or physical repositioning of the payment object reader with respect to the POS terminal causes the reader to be at a new location with respect to the POS terminal. As a result, the power levels tracked by the POS terminal are also different. The POS terminal tracks power levels corresponding to all new locations dictated by the POS terminal.

At step 218, the POS terminal analyzes the RSSI values from all broadcasting readers. For example, the POS terminal monitors the data to determine the reader, such as reader 110-1, associated with varying RSSI values. The POS terminal also computes a differential or delta of RSSI values, also called as dynamic RSSI for all or selected broadcasting readers. When computing the delta of RSSI values for some broadcasting readers, the POS terminal returns null value for delta since these readers are not moving with respect to the POS terminal. In some implementations, the POS terminal returns a non-zero value but less than a threshold value for certain readers. This is tagged as noise and rejected for all subsequent logic. In yet another implementation, the POS terminal determines a value more than a threshold value as more than one reader may be moving with respect to the same terminal or other terminals in vicinity of the POS terminal. In such cases, the POS terminal arranges the readers in the order of delta of signal strength. In some cases, the POS terminal narrows down the intended reader by matching movement with generated instructions on its interface. This ensures that the intended reader was following the directions being displayed on the POS terminal.

Through the analysis, the pairing application lists the devices that are available to be paired with the POS terminal 106. The pairing application may determine the list based on, for example, the current location of the differential signal strength based on directed or non-directed movement of the reader with respect to the POS terminal 106. Optionally, the geographical location may also be used. Using the dynamic RSSI and location, the pairing application lists all devices that lie within a predetermined network area.

At step 220, the user selects the reader from amongst the list of readers displayed on the POS terminal 106. In one implementation, the highest order reader is the intended payment object reader. In other implementations, the user may cross-verify the reader identity with another identifier such as name or registration number. On selection, the POS terminal 106 facilitates pairing of the terminal with the intended reader, for example by following-up with additional steps such as sharing of authentication code or password. In some implementations, the POS terminal 106 can send hashed or otherwise encrypted authentication code to a cloud server, such as PPS, for confirmation and pairing.

For the sake of example, assume that the payment object readers 110-1 and 110-2 (collectively referred to as payment object reader 110) are near POS terminal 106 and within the terminal's communication range, where range is defined by the communication protocol on which all devices are operating. Also assume that all devices, including terminal and readers are broadcasting their presence to each other.

For example, in one implementation, the user configures the payment object reader 110 for pairing mode to allow it to be discovered and/or be prepared for pairing (step 208). Depending on the configuration of the payment object reader 110, the payment object reader 110 can be configured in multiple ways. One implementation includes pressing and holding a pairing button located on the payment object reader 110, as described in reference to FIGS. 5 and 6.

By activating the pairing mode on the payment object reader 110, the user can initiate the pairing process (step 208). Subsequently, the user performs a pairing technique using the POS terminal 106. Depending on the implementation, the pairing technique can be a signal-strength based pairing technique, as described in reference to FIG. 2A-B, or FIGS. 4A-4B.

In some implementations, the POS terminal 106 determines which pairing technique to use based on data (e.g., registration number associated with the payment object reader 110) that is received from the intended payment object reader, say reader 110-1 during the device discovery phase.

Based on the technique either automatically chosen by the POS terminal 106 or manually by the user, the pairing application can provide the user with instructions on how to pair a specific payment object reader 110-1. The user can interact with the payment object reader 110-1 through the POS terminal 106 once the pairing technique is performed successfully (steps 210 and 212). For example, the pairing technique is performed successfully when the user moves the intended reader 110-1 as directed by the POS terminal 106 or randomly within time duration. The movement of the reader causes the POS terminal 106 to register plurality of signal strength values corresponding to a specific reader. The POS terminal 106 computes a differential value of RSSI based on collected values, say by analyzing the last two values or the highest and lowest values, or even an average of values. The POS terminal 106 filters the reader from amongst other readers in the vicinity like payment object reader 110-2.

The POS terminal 106 can either automatically select the reader 110-1 based on detection of dynamic RSSI or through user engagement. Subsequently, the POS terminal 106 can request the user to correctly verify or provide an authentication code for security reasons. For example, the reader 110-1 generates a color code, also referred to as optical authentication data, to be flashed on the LEDs 124 associated with the payment object reader 110-1, or when the user successfully adjusts the location of the payment object reader such that the reader is top of the list, as instructed to the user on the POS terminal 106. On receiving the correct color code, the communication between POS terminal 106 and payment object reader 110-1 is established and pairing is complete.

Figure 3:
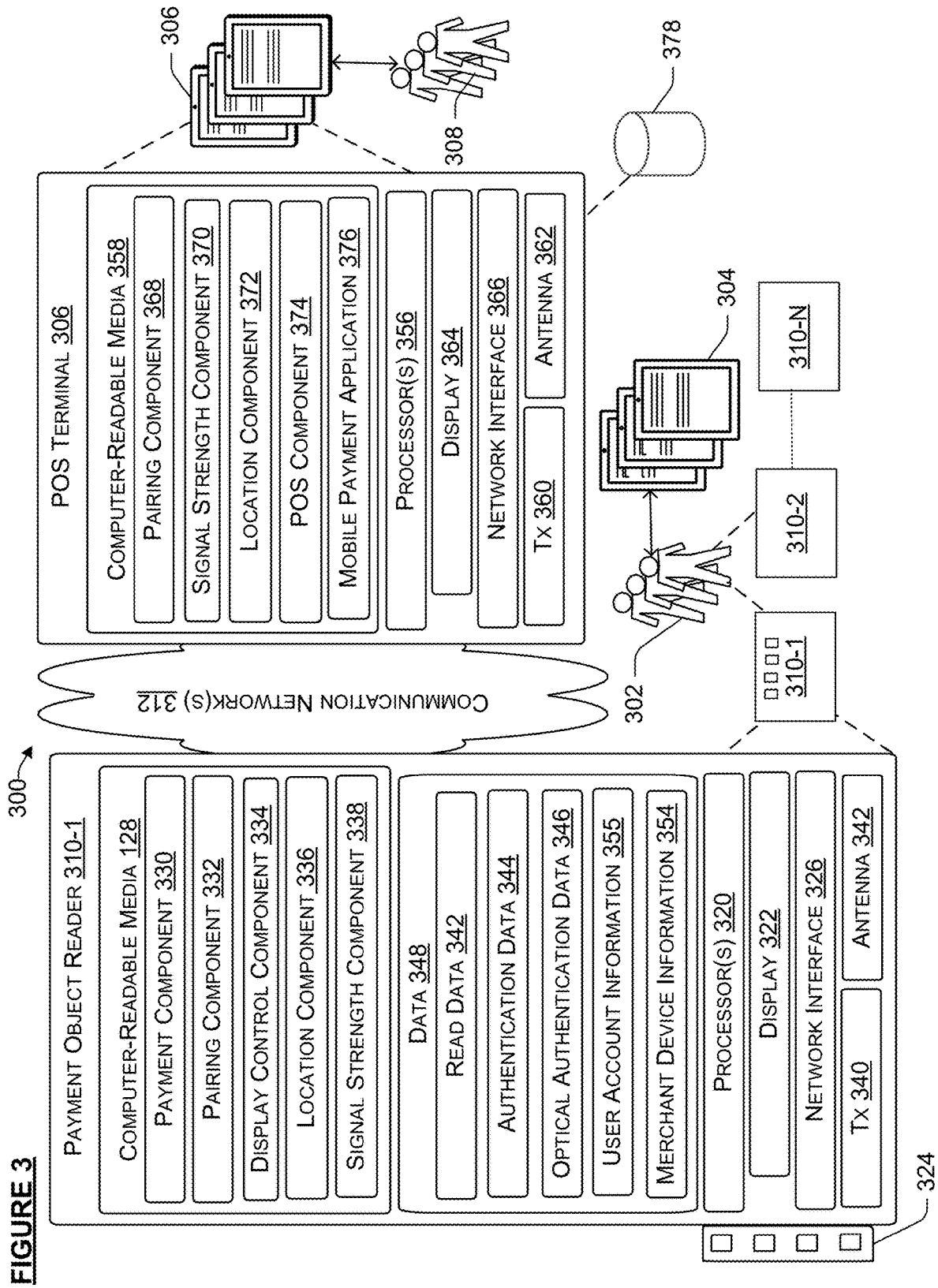
FIG. 3 illustrates various components within the payment object reader and the POS terminal that enable pairing and thereby, wireless communication between the payment object reader and the POS terminal, according to an embodiment of the present subject matter.
Figure 4A:
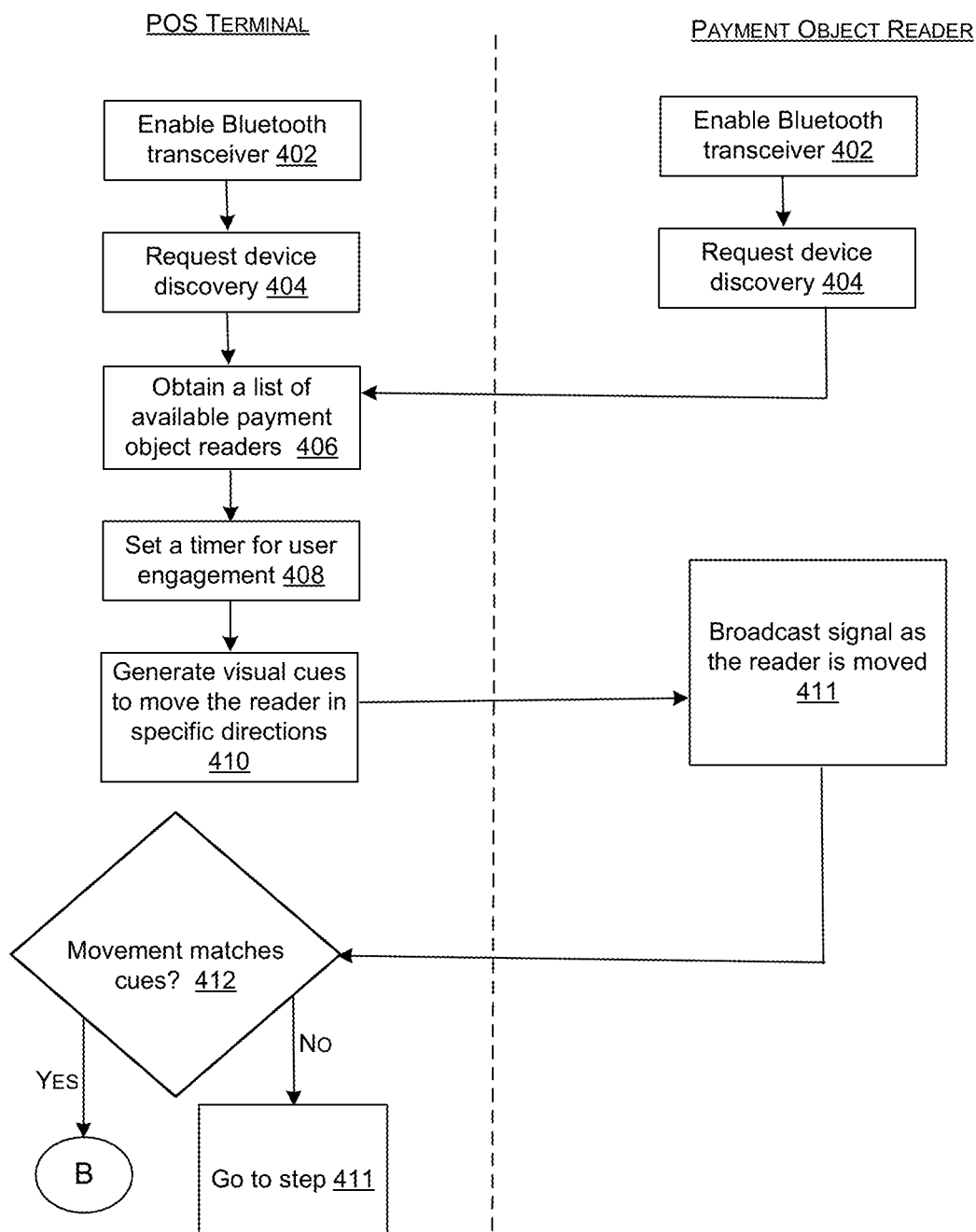
FIGS. 4A and 4B is a dataflow that illustrates the method of enabling wireless, such as Bluetooth, communication between the payment object reader and the POS terminal based on an dynamic and absolute signal strength values, according to an exemplary embodiment of the present subject matter.
Figure 4B:
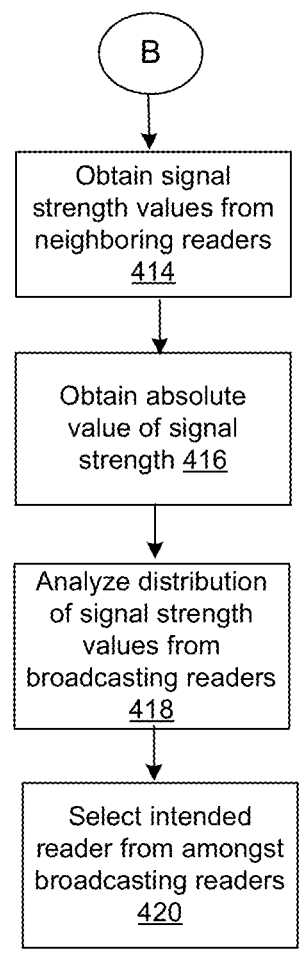

FIG. 3 illustrates various components within the payment object reader and the POS terminal that enable pairing and thereby, wireless communication between the payment object reader and the POS terminal, according to an embodiment of the present subject matter. In one implementation, the system 300 includes one or more POS terminal(s) 306, belonging to a merchant 308 (only one is shown for simplification of the description), and one or more payment object readers 310-1, 310-2, . . . , 310-N(interchangeably and collectively referred to as payment object reader 310) connected or capable of communicating through communication network 318. In some implementations, the payment object reader 310-1 may be similar to payment object reader 110 in construction and operation. Similarly, in some implementations, the POS terminal 306 may be similar to POS terminal 306 in construction and operation. As shown in FIG. 3, the POS terminal 306 may also be connected to a payment processing system, a bank computing device, and a card payment network computing device (not shown), through via the communications network(s) 312 or a different network.

Even though the architecture of only payment object reader 310-1 is shown, it will be understood that other payment object readers may include similar program components and data. Furthermore, the merchant 308 and the payment object reader 310-1 can also interact with each other. For example, the interaction of the merchant 308 may be in the form of card swipe or card insertion into the payment object reader 310-1. Furthermore, while the payment object reader 310-1 may be shown to be external to the POS terminal 306, in some implementations, the payment object reader 310-1 may be a component within the POS terminal 306 or directly connected to the POS terminal 306, for example through a universal serial bus (USB) connection or the audio jack of the POS terminal 306. In embodiments where there is a wired connection between POS terminal 306 and payment object reader 310-1, pairing may either be established over the wired connection or pairing may be over a wireless connection and the wired connection may be for power transfer or data transmission, for example.

In one implementation, the payment object reader 310-1 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain payment transaction data off a payment object 304. Accordingly, the payment object reader 310-1 may include hardware implementation, such as slots, magnetic tracks, and rails with one or more sensors or electrical contacts to facilitate detection and acceptance of a payment object 304. The payment object reader 310-1 may also include: one or more processor(s) 320; a display 322 having one or more visual indicators such as light emitting diodes 324 with or without any keypad, touch-screen or other input device for the user 302 or merchant 308; a network interface 326; and computer-readable media 328.

The processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Texas Instruments OMAP and MSP microcontroller, ARM Holdings processor like the Cortex-A, -M -R, Series, or ARM series and/or the like processor(s).

The computer-readable media 328 stores a payment component 330, a pairing component 332, a display control component 334, a location component 336, and a signal strength component 338. In one implementation, the payment component 330 is configured to detect and receive payment information from a payment object 304 introduced in or around the payment object reader 310. The various components shown in FIG. 3 can be implemented by using hardware, software, firmware or a combination thereof, including one or more signal processing and/or application specific integrated circuits. Further, the environment 300 of FIG. 3 can be implemented based on other architectures in other embodiments.

The pairing component 332 controls and modifies the pairing parameters or authentication data in order to pair the payment object reader with any peripheral device, including POS terminal 308. The pairing component 332 is also used to receive authentication data and convert that data into optical authentication data to be displayed on the display 322. The display control component 334 controls the intensity, color, and strength of brightness of the LEDs 324, for example in response to input received from the pairing component 332. The location component 336 in conjunction with GPS units, determines the location coordinates of the payment object reader 310 at any time. The location component 336 can also determine the distance between the payment object reader 310 and any other peripheral device including the POS terminal 306.

The signal strength component 338 determines the network connectivity strength or power levels of broadcasting devices, for example in terms or RSSI or dBm, in the vicinity of the payment object reader 310 by receiving signals emitted by neighboring devices, within a specified time duration. The signal strength component 338 tracks the signal strength values corresponding to one or more broadcasting devices, including the POS terminal 306. The RSSI values can be stored in read data 342.

The display 322 may provide various functionalities for accessibility, such as vibrating, sounding, lighting an indicator, such as light emitting diode (LED) 324, or displaying other lights, color, or animation on a screen display to communicate a specific digit or value of a digit, or even status of the payment transaction or device. Furthermore, the LEDs can be controlled to deliver other kinds of data by modifying the intensities and color combinations of the LEDs 324.

Such LEDs may already be included in a payment object reader 310 to be in compliance with EMV specifications. In one implementation, interface 322 and the LEDs 324 may be used to optically transmit pair communication data or authentication data 344 to a merchant 308 attempting to couple the POS terminal 306 with the payment object reader 310. In such implementations, the display control component 334 converts the authentication data into a color code, which can be transmitted as optical authentication data 346 using a specific arrangement or color combinations of LEDs. The display control component 334 can also modify the signals into the LEDs 324 to change colors dynamically in response to varying values of authentication data 344. Thus, it is possible to use a LED display system for both optical display of transaction status and to broadcast pair information data through LEDs.

The payment object reader 310 may also include one or more wireless transceiver(s) 340 connected to antenna(s) 342, thereby enabling wireless transmission and reception of various communication and/or sensor protocols. For example the antenna(s) 342 may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3G/HSDPA/HSUPA/LTE (4G) communications, global positioning system (GPS) thereby allowing the payment object reader 310 to determine its distance, for example, from the POS terminal 306. There may be either one transceiver capable of handling communication on the protocols mentioned above, or there may be a transceiver configured for each protocol. Thus, there may be a Bluetooth transceiver, a Wi-Fi transceiver, an NFC transceiver, and so on. The transceiver 340 may communicate with the location component 336 to determine the location of a merchant 308 or customer 302 performing a payment transaction via payment object 304. In one implementation, the location information may be used to pair a specific payment object reader 310 amongst a plurality of payment object readers 310. The payment object reader 310 may also include a database 348 to store data read off a payment object 304 (the data is hereinafter referred to as "payment object read-data" or "read-data" 350), user account information 352, and POS terminal or POS terminal information 354. The authentication data 344 and optical authentication data 345, i.e., data broadcasted via the LEDs 324, can also be stored in the database 348.

In various embodiments, the network interface 326 may support wireless data transfers between the payment object reader 310 and the POS terminal 106. Wireless protocols may include Wi-Fi (e.g. IEEE 802.11a/b/g/n, WiMax), Bluetooth® or Bluetooth low energy (BLE); infrared, and the like, through BLE interface, WiFi interface, QR interface, NFC interface, EMV interface, cellular technology interface, and other interface(s). According to one implementation, the network interface 326 can be a BLE interface ("BLE") that is configured to work on Bluetooth or BLE protocol to facilitate communication with the transceiver installed on other devices. In one implementation, BLE is intended for low-power and low-latency applications for wireless devices within a short range, such as up to about 50 meters. BLE interface may be used in applications requiring intermittent communications, smaller amounts of data transfer and bandwidths, and/or low duty cycles. BLE interface can be configured to use only a fraction of the power as compared to other interfaces. In many cases, BLE interface may be able to operate more than a year on the power source without charging.

BLE interface is capable of being paired with interfaces of a peripheral device, such as a POS terminal 306 associated with the merchant 308 or payment object reader 310, thus allowing the payment object reader to serve as a "beacon" and broadcast read-data. To this end, the embodiments described herein pair a desired payment object reader to a specific POS terminal 306. As defined herein, a beacon is a short-range communication device having a known or fixed location that provides a signal that can be detected by mobile devices within proximity of the beacon. For example, BLE interface can transmit a radio frequency (RF) signal that includes its position coordinates (e.g., latitude, longitude), which can be detected by a mobile device. Alternatively, BLE can transmit other data, such as pair information data of the payment object reader 304. In one implementation, the pairing component can convert a factory-set pair information data to static or constantly varying string of colors, brightness, or intensities.

The payment object reader 310 as BLE beacon allows for constant, scheduled or random scanning of other Bluetooth peripherals and devices. In one implementation, a component, such as BLE interface component, within the payment object reader 310 can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to pair information data.

For the sake of simplicity of discussion, the internal architecture of only one payment card reader 310-1 is shown. Other payment card readers may be similar or different than the payment card reader 310-1. The architecture of an exemplary POS terminal 306 is now discussed.

In one implementation, the POS terminal 306 (also referred to as the merchant device 306) may include one or more processor(s) 356, computer-readable media 358, POS transceiver(s) 360, an antenna 362, a display 364, and a network interface 366. The computer-readable media 358 may store a pairing component 368, a signal strength component 370, location component 372, and a POS component 374. Similar to the payment object reader 310, there may either be one transceiver 360 capable of handling communication on the protocols mentioned above, or there may be a transceiver 360 configured for each communication protocol. Thus, there may be a Bluetooth transceiver, a Wi-Fi transceiver, an NFC transceiver, and so on.

The signal strength component 370 determines the network connectivity strength or power levels of broadcasting devices, for example in terms or RSSI or dBm, in the vicinity of the POS terminal 306 by receiving signals emitted by neighboring devices, within a specified time duration. The signal strength component 370 determines the Bluetooth network connectivity or signal strength indication of devices, such as the payment object readers 310. For example, the received signal strength indicators (RSSI) corresponding to the Bluetooth transceivers 340 from each of the payment object readers 310 may be received and stored in program data 378. In another example, RSSI corresponding to NFC or Wi-Fi transceivers 340 may also be received and stored in program data 378. In one implementation, a combination of RSSIs from the Bluetooth and NFC/Wi-Fi receivers 340 may also be computed and stored in program data 378. The signal strength component 370 tracks the signal strength values corresponding to one or more broadcasting devices, including the payment object reader 310-1. The signal strength component 370 determines a timer value such as duration or window length and interval length of various intervals within the window for the user to move the device. The signal strength component 370 then tracks values of RSSI within the window length and between the interval lengths or time instants, thus obtaining multiple values corresponding to unique positions of the reader. In one implementation, the windows and intervals are periodic, while other implementations rely on random lengths. In some cases, the signal strength component 370 also configures the number of attempts for a user to move the reader or POS terminal within the window and interval time. In case the user fails to move the reader within the interval or window or move the reader to a specific location, the timer may reset itself or just the window or interval resets. The signal strength component 370 also generates visual cues or instructions for the user to follow. The visual cues direct the user to move the reader or the terminal in the specified direction. In some cases, the user can randomly move the reader or hover around the terminal for a duration specified by the timer. The signal strength component 370, along with an accelerometer or the location component 372, can also map the actual movement of the device with respect to the POS terminal 306. This is helpful to ensure that the actual movement maps to the directions being displayed on the POS terminal 306. This is also helpful in physically identifying the intended reader.

The signal strength component 370 also obtains absolute threshold values for RSSI based pairing, for example from an internal database 378 or externally from PPS 112. The threshold values vary based on various factors such as: operating system of POS terminal, that is whether the POS terminal is an iOS, Windows or Android device; the type of the POS terminal, that is whether the POS terminal is a tablet, a computer, a cell phone or an integrated payment system; and other hardware and/or software specifications of the Bluetooth transceiver running on the POS terminal or other neighboring devices, and so on. The signal strength component 370 is also configured to calibrate measured RSSI values based on a calibration factor. The calibration factor may also be based on the factors mentioned above. So, the POS terminal 106 can calibrate the values of the RSSI levels based on the calibration factor and then compared with a fixed absolute threshold value. In other implementations, the received RSSI value is compared to an absolute value that has been calibrated for the POS terminal based on any of the factors or combination of factors mentioned above.

The POS component 374 is also configured to receive payment information derived by a payment object reader 310 from a payment object 304 introduced in or around the payment object reader 310. The pairing component 368 can be configured to control and modify its own pair information data or authentication data in order to pair the POS terminal 306 with a payment object reader 310 or any other peripheral device. The pairing component 368 can also receive pair information data from surrounding devices, e.g., the payment object reader 310 and store such data in program data 378. The pairing component 368 also controls presentation of the neighboring Bluetooth enabled devices on the display 364 in the form of an interactive or static list, record, etc. In some embodiments, mobile payment applications 376 may run on the POS terminal 306. Such payment applications may generate a graphical user interface to be displayed on display 364 to allow a merchant 308 or a user 302 to manually enter payment information, such as debit account information, or make selections with respect to the payment object reader 310. Thus, the payment applications may also allow the merchant 308 to pair the POS terminal 306 to a specific payment object reader 310 of interest. The POS terminal 306 may include a POS Bluetooth transceiver 360, which when activated, may detect the payment object readers 310, which have their respective Bluetooth transceivers 340, enabled.

Furthermore, the location component 372 in conjunction with GPS units, can determine the location coordinates of the neighboring payment object reader(s) 310 at any time. The location component 372 can also determine the distance between the POS terminal 306 and another payment object reader 310.

In some implementations, the communication network(s) 312 may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the one or more networks 312 may include both wired and/or wireless communication technologies, including Bluetooth®, Bluetooth® low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally, the communication network 312 may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

FIG. 4 is a dataflow that illustrates the method of enabling wireless, such as Bluetooth, communication between a payment object reader and the POS terminal based on a combination of dynamic and absolute values of RSSI, according to an exemplary embodiment of the present subject matter. Components of FIG. 3 have been used to clarify some aspects of the method flow.

Initially, a merchant enables the Bluetooth transceiver of its POS terminal, e.g., POS terminal (step 402), for example, by toggling a switch that is in turn connected to an antenna. By enabling a Bluetooth toggle switch, the method automatically enables the device discovery. Optionally or additionally, the merchant may explicitly request device discovery through a user input (step 404). Meanwhile, at the same or substantially same time instant, the merchant also enables the Bluetooth transceiver of readers, for example payment object reader 310-1 and 310-2 (shown as steps 402 and 404 respectively). Device discovery facilitates a merchant to discover one or more devices, in a network defined by Bluetooth standards, with which it may want to communicate. By enabling the transceiver, a wireless signal is emitted from the POS terminal that is used to detect wireless signals from other Bluetooth-enabled devices, such as payment object readers 310 whose Bluetooth transceivers are enabled. Thus, in response to device discovery, the list may show two payment object readers 310-1 and 310-2 in the vicinity. The order of the payment object readers 310-1 and 310-2 on the list may be based on the signal strength or proximity of the payment object readers 310 from the POS terminal 306. The method includes obtaining a list of available payment object readers 310 (step 406) and display in a manner and order that is either fixed or based on user preference. In one implementation, the merchant may physically change the order or preference of the payment object reader shown on the list or even introduce a new payment object reader, for example 310-3, into the list by physically moving the desired payment object reader closer to or further away from the POS terminal 306. By moving the payment object reader 310-3 closer, e.g., within an inch from the POS terminal 306, chances of discovery can be increased.

Traditionally, the list of devices is not indicative of the merchant preference and is simply based on how far the reader is from the POS terminal. However, some readers may be equidistant to the POS terminal. In some examples, the readers may interact differently with the POS terminal and may or may not be discoverable at a certain distance to a POS terminal. To this end, the present subject matter modifies and customizes the order of devices to match merchant preference based on merchant interaction with the identified reader. This is further described subsequently. The POS terminal obtains a plurality of signal strength values within a time window from a moving payment object reader, and then computes a dynamic RSSI based on the plurality of signal strength values.

In some implementations, the POS terminal 306 sets a timer value within which the POS terminal 306 generates visual cues and tracks user engagement in response to the visual cues, for example in terms of movement of the POS reader as per generated visual cues. In one implementation, the timer starts only after the user has agreed to accept the visual cues. The timer can be a countdown timer on the interface displaying the cues. The POS terminal 106 partitions the timer value into periodic or random time instants (step 408).

Within the time initialized by the timer, the signal strength component 370 of the POS terminal 306 generates visual cues within the preset timer and time instants to move the intended payment object reader in a specific direction or a pattern or sequence of directions, for example in a specific shape at each time instant and to complete the motion within a predetermined time. In other implementations, the signal strength component 370 can generate cues to move the reader in a random direction or directions. The signal strength component 370 can display the cues on a graphical user interface 364 of the POS terminal 306. For example, the cues can direct the user to move the reader in vertically or horizontally. The POS terminal 106 generates directions for the user to move the intended payment object reader to a new position through visual, or other tactile means. In some implementations, the POS terminal tracks RSSI values at random or set time instants without generating visual cues. For example, a user may move the reader in random directions, for example the user follows the direction specified in the visual cues or a direction not specified as well. The visual cues may include waving hand in front of the reader to give the impression of the signal strength changing. Accordingly, the reader broadcasts signals in response to whatever direction the reader is moved. The signals have varying power levels corresponding to the positions where the reader is located. The signals can be Bluetooth, Wi-Fi, or any other type of communication signals that can indicate both presence and/or location (step 411), while the POS terminal tracks the various RSSI values at different locations for subsequent processing, within the set time. In some other implementations, the signal strength component 370 does not assign time but may assign a fixed number or sequence of movements. For example, signal strength component 370 generates cues to move the reader four times. In another implementation, the signal strength component 370 generates cues to move the reader following a pattern without any time restriction (step 410).

At step 412, the signal strength component 370 tracks movement of surrounding devices, including reader 310-1, and confirms that the movement of the payment object reader 310-1 matches the direction indicated by the visual cues. On determining correct movement, the flow transitions to step 216. In case the movement is incorrectly followed, the directions are either re-generated as in step 212 or the process resets the timer value at 210.

At step 414, the POS terminal 306 obtains RSSI values from neighboring and discovered devices at each time instant, including the reader that is being moved relative to the POS terminal 306. The POS terminal tracks the RSSI values of other broadcasting devices, such as readers and terminals, as well. The POS terminal obtains signal strength levels, for example in terms of RSSI or dBm or dbW, and corresponding to each location of the reader with respect to the POS terminal, including the desired payment object reader 310-1 at the time instants. The movement or physical repositioning of the payment object reader with respect to the POS terminal causes the reader to be at a new location with respect to the POS terminal. As a result, the power levels tracked by the POS terminal are also different. The POS terminal tracks power levels corresponding to all new locations dictated by the POS terminal.

At step 416, the POS terminal 306 also obtains an absolute value of RSSI, for example corresponding to a fixed distance between the payment object reader 310-1 and the POS terminal. The POS terminal 306 generates cues to place the payment object reader 310-1 at the fixed position. In another implementation, the POS terminal 306 takes the first (or last) value from step 414 as absolute value of RSSI. In other implementations, the POS terminal 306 determines an average, median, mode, or otherwise derivative of distribution of values obtains at step 414. In yet another implementation, the POS terminal 306 applies a calibration factor to the absolute RSSI value. For example, the calibration factor may be based on: operating system of POS terminal, that is whether the POS terminal is an iOS, Windows or Android device; the type of the POS terminal, that is whether the POS terminal is a tablet, a computer, a cell phone or an integrated payment system; and other hardware and/or software specifications of the Bluetooth transceiver 360 running on the POS terminal 306 or other neighboring devices, and so on. In some cases, the calibration is performed at a later stage.

At step 418, the signal strength component 370 analyzes the distribution of RSSI values from all broadcasting readers corresponding to multiple locations and the absolute RSSI value corresponding to a fixed location. For example, the signal strength component 370 monitors the data to determine the reader, such as reader 110-1, associated with a dynamic RSSI value based on varying RSSI values and absolute RSSI value. The POS terminal computes the differential or delta of RSSI values, also called as dynamic RSSI for all or selected broadcasting readers. When computing the delta of RSSI values for some broadcasting readers, the signal strength component 370 returns null value for delta since these readers are not moving with respect to the POS terminal. In some implementations, the signal strength component 370 returns a non-zero value but less than a threshold value for certain readers. This is tagged as noise and rejected for all subsequent logic. In yet another implementation, the signal strength component 370 determines a value more than a threshold value as more than one reader may be moving with respect to the same terminal or other terminals in vicinity of the POS terminal. In such cases, the signal strength component 370 arranges the readers in the order of delta of signal strength. In some cases, the signal strength component 370 narrows down the intended reader by matching movement with generated instructions on its interface. This ensures that the intended reader was following the directions being displayed on the POS terminal.

The signal strength component 370 also compares the absolute value to a threshold value. In cases where the threshold value is fixed, the signal strength component 370 calibrates the absolute value as per the calibration factor before comparing the absolute value to the threshold value. However, in cases where the threshold value of calibrated as per calibration factor, the signal strength component 370 compares the absolute value to the threshold value.

Thus, the signal strength component 370 obtains both the comparison between a first threshold value and absolute value and a dynamic RSSI value greater than a second threshold value. The second threshold value may be the same as the first threshold value in some implementations. The signal strength component 370 also computes a likelihood of Bluetooth pairing factor based on the comparison with the absolute value and the dynamic value, where each of the values may be weighted. The likelihood may be in the range of 0 to 1. In some implementations, multiple devices may have higher than threshold dynamic and absolute RSSI values, and as such the same or more than 0.5 likelihood factor. In this case, the signal strength component 370 lists the devices in descending order of likelihood. In cases of similar values, the signal strength component 370 can prioritize devices based on names, proximity, or actual location tracking. In one implementation, the signal strength component 370 obtains the first and second threshold values in real-time or an earlier instant from the PPS, such as PPS 112.

Through the analysis, the pairing application lists the devices that are available to be paired with the POS terminal 106. The pairing application may determine the list based on, for example, the current location of the differential signal strength based on directed or non-directed movement of the reader with respect to the POS terminal 106. Optionally, the geographical location may also be used. Using the dynamic RSSI and location, the pairing application lists all devices that lie within a predetermined network area.

At step 420, the user selects the reader from amongst the list of readers displayed on the POS terminal 306. In one implementation, the highest order reader is the intended payment object reader. In other implementations, the user may cross-verify the reader identity with another identifier such as name or registration number. On selection, the POS terminal 306 facilitates pairing of the terminal with the intended reader, for example by following-up with additional steps such as sharing of authentication code or password. In some implementations, the POS terminal 106 can send hashed or otherwise encrypted authentication code to a cloud server, such as PPS, for confirmation and pairing.

For the sake of example, assume that the payment object readers 310-1 and 310-2 (not shown) are near POS terminal 306 and within the terminal's communication range, where range is defined by the communication protocol on which all devices are operating. Also assume that all devices, including terminal and readers are broadcasting their presence to each other.

For example, in one implementation, the user configures the payment object reader 310-1 and 310-2 for pairing mode to allow it to be discovered and/or be prepared for pairing. Depending on the configuration of the payment object reader 310-1, the payment object reader 310-1 can be configured in multiple ways. One implementation includes pressing and holding a pairing button located on the payment object reader 110, as described in reference to FIGS. 5 and 6.

By activating the pairing mode on the payment object reader 310-1, the user can initiate the pairing process (step 208). Subsequently, the user performs a pairing technique using the POS terminal 306. Depending on the implementation, the pairing technique can be a signal-strength based pairing technique, as described in reference to FIG. 2A-B, or FIGS. 4A-4B.

In some implementations, the POS terminal 306 determines which pairing technique to use based on data (e.g., registration number associated with the payment object reader 310-1) that is received from the intended payment object reader, say reader 310-1 during the device discovery phase.

Based on the technique either automatically chosen by the POS terminal 306 or manually by the user, the pairing application can provide the user with instructions on how to pair a specific payment object reader 310-1. The user can interact with the payment object reader 310-1 through the POS terminal 306 once the pairing technique is performed successfully. For example, the pairing technique is performed successfully when the user moves the intended reader 310-1 as directed by the POS terminal 106 or randomly within time duration. The movement of the reader causes the POS terminal 306 to register plurality of signal strength values corresponding to a specific reader. The POS terminal 306 computes a differential value of RSSI based on collected values, say by analyzing the last two values or the highest and lowest values, or even an average of values and indicates that the delta is based on movement of reader. The POS terminal also computes an absolute value of RSSI corresponding to a specific location. The POS terminal 106 filters the reader from amongst other readers in the vicinity like payment object reader 110-2.

The POS terminal 306 either automatically selects the reader 310-1 based on detection of dynamic RSSI and absolute RSSI or through user engagement. Subsequently, the POS terminal 306 can request the user to correctly verify or provide an authentication code for security reasons. For example, the reader 310-1 generates a color code, also referred to as optical authentication data, to be flashed on the LEDs 124 associated with the payment object reader 110-1, or when the user successfully adjusts the location of the payment object reader such that the reader is top of the list, as instructed to the user on the POS terminal 306. On receiving the correct color code, the communication between POS terminal 306 and payment object reader 310-1 is established and pairing is complete.

The paired devices can then exchange information between each other; information such as payment information obtained from the payment objects. Even though the description relates to transmitting and receiving authentication data for pairing, it will be understood that security tokens may also be transmitted, for example, using the channel for authentication data or a separate channel. Furthermore, the authentication data and the security token may either be sent together as one data packet or sequentially.

The above method uses delta and absolute RSSI values or representations to pair two devices. In some cases, only delta or only absolute values may be used together for an alternative or additional level of security. For example, the payment object reader 310 may couple only to devices that are at a predefined distance away (such as a distance within the Bluetooth or BLE network), confirmed using the RSSI levels or even the location coordinates, obtained using the signal strength component 338 and the location component 336, respectively.

In some implementations, embodiments of the methods and systems described herein can pair a payment object reader to the POS terminal with protection from MITM attacks. MITM is an attack by a rogue device which attempts to insinuate itself into the legitimate Bluetooth "trust dialogue" during pairing. While the two victim devices are attempting to discover (find) each other and pair (interactively communicate) with each other for the first time, an attacker's rogue device in between the two legitimate devices attempts to respond to both of the victims' devices in order to compel them both to believe they have found each others' (legitimate) device, when, in fact, they're only each communicating with and/or through the attacker's rogue device (which then facilitates indirect communication between the two victim devices through the rogue intermediary). In this way, the attacker's device gains full trust from both devices.

Some Bluetooth devices pair using a Secure Simple Pairing (SSP). SSP introduces four Association Models for pairing, namely: Pass Key Entry, Out-Of-Bounds (OOB), Numeric Comparison and an association option in the Bluetooth standard known as "Just Works". The choice of which model is used is based on the input and output capabilities of the two devices to be paired. The first three models (Pass Key Entry, OOB and Numeric Comparison) provide protection against the MITM attack, whereas the Just Works model generally does not. This is because the Just Works model is used when there is no display for output and no keyboard for numerical input on at least one of the two devices and, therefore, it provides no mechanism to verify that the two devices are communicating directly with each other instead of through an attacking device. The Just Works model begins just as the Numeric Comparison model does by generating a password but since there is no display for output, Just Works assumes user confirmation and proceeds with pairing without actual user confirmation. Without the user confirmation of the 6-digit number, Just Works model is vulnerable to the MITM attack.

As described herein, the pairing scheme allows the payment object reader 110 and the terminal protection from fraud and ease of pairing by providing methods to pair and obtain user confirmation especially in cases where multiple readers are present and identification is difficult.

Figure 5:
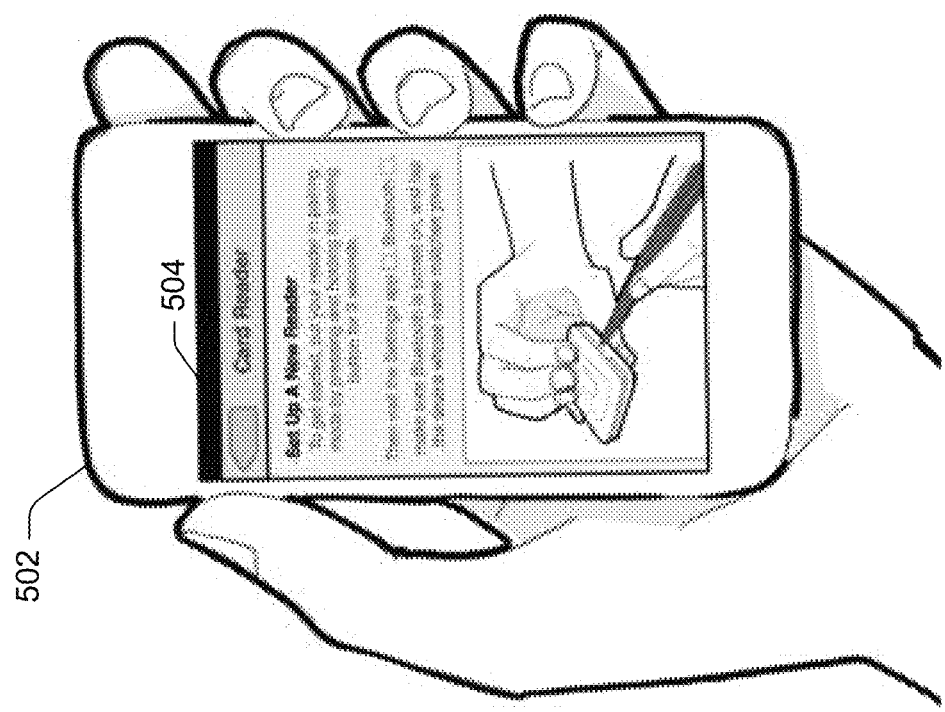
FIG. 5 illustrates an example user interface for a technique to prepare a payment card reader for pairing with the POS terminal, according to an exemplary embodiment of the present subject matter.

FIG. 5 illustrates an example user interface 504 for a technique to prepare a payment card reader for pairing with a POS terminal 502. The user interface 504 provides instructions for pairing a payment object reader using a name verification technique. In some implementations, the name verification technique involves inputting, into the computing device 502, a name or alias that is printed on the payment object reader. The computing device 502 can send the inputted name to the payment object reader. The payment object reader or an external server, e.g., payment processing system, can evaluate the name received from the computing device 502 to compare the inputted name with the name that is printed on the wireless card reader. Pairing of the computing device 502 with the payment object reader is complete if the inputted name matches the name that is printed on the payment object reader. The merchant may also enter or select an alias assigned by the user and may or may not be similar to the name printed on or associated with the payment object reader. To this end, the external server may maintain a look-up table mapping the aliases to actual names.

Figure 6:
FIG. 6 illustrates an example payment object reader shown as having a button that can be pressed and held for a specified duration of time to enable pairing mode, according to an exemplary embodiment of the present subject matter.

In some implementations, before entering the name to initiate pairing, the payment object reader is configured for pairing mode by pressing and holding a pairing button on the payment object reader for a specified duration of time (e.g., three seconds), as described in reference to FIG. 6. In such implementations, the user interface 504 provides instructions that instruct a user to pair the payment object reader by pressing and holding the pairing button on the payment object reader for a specified duration. In another example, the user may be asked to hold until they hear a clicking sound.

FIG. 6 illustrates an example payment object reader 606. In FIG. 6, a pairing button 608 on the payment object reader 606 is shown as having been pressed and held for a specified duration of time. The payment object reader 606 is configured for pairing mode when the pairing button 608 has been held for the specified duration of time. Optionally, the pairing mode is triggered in response to other kinds of inputs, such as visual, audio or haptic input. Accordingly, instead of a button, different types of interfaces may be provided. For example, the interface may include an audio sensor that responds to sound signals of a particular frequency. The interface can also be a switch that toggles between ON and OFF. A single switch may exist for both turning the device on and for turning the pairing mode on. In some cases, the payment object reader 606 may automatically turn on when placed close to a computing device, e.g., a point of sale terminal having a known configuration.

Figure 7:
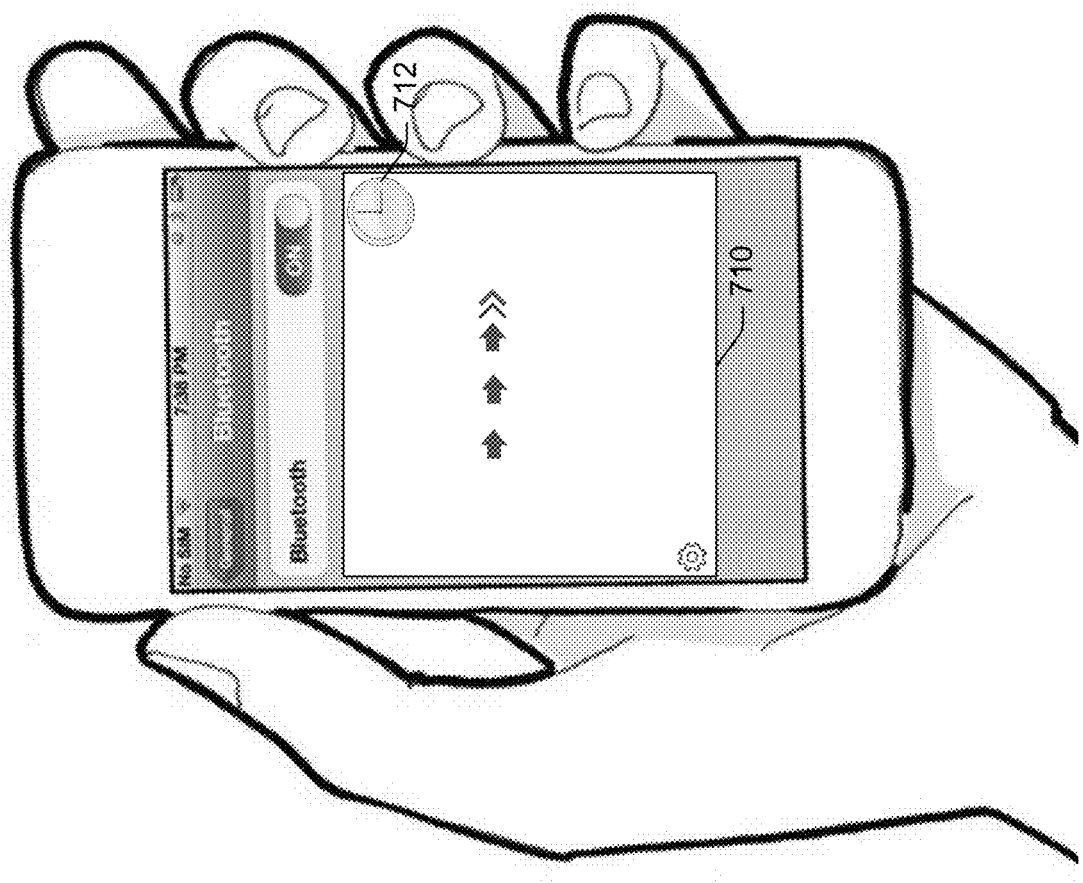
FIG. 7 illustrates an example user interface, being presented on a computing device, for pairing the POS terminal with the payment object reader, according to an exemplary embodiment of the present subject matter.

FIG. 7 illustrates an example user interface 710, being presented on the computing device 502, for pairing the computing device 502 with the payment object reader 606, as described in reference to FIG. 6. As shown, the computing device 502 generates cues for the intended reader to be mode in directions as prescribed. For example, the user interface 710 can instruct the user to move the reader to the right. Additional interfaces may follow after successful completion of this step. For example, the second user interface (not shown) may instruct the user to move the reader towards the left. As shown the timer 712 indicates the time the user has to make the indicated movement. In some implementations, the computing device 502 indicates the exact position (for example relative to the computing device 502) the reader to be moved. For example, the reader can be moved to the back of the computing device 502, and so on.

Figure 8:
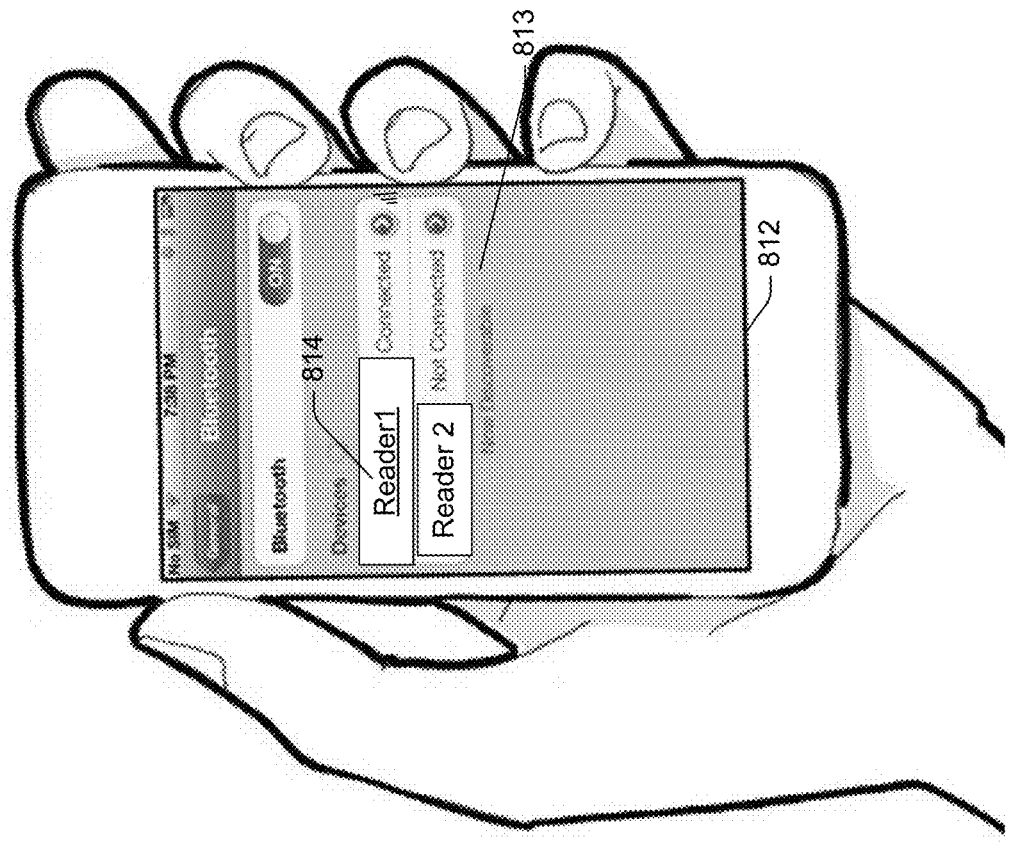
FIG. 8 illustrates an example user interface, being presented on the POS terminal, for verifying a name for the payment object reader, according to an exemplary embodiment of the present subject matter.

FIG. 8 illustrates an example user interface 812, being presented on the computing device 502, for verifying a name for the payment object reader 606. In FIG. 8, the user interface 812 presents the user with options 813 for confirming whether the name 814 displayed on the user interface 812 matches the name for the payment object reader 806. Also, the readers are arranged in the order of likelihood that the user intends to pair with the POS terminal. The likelihood is computed based on movement of the reader with respect to the POS terminal, which is further based on changing values of RSSI and absolute values of RSSI compared with threshold values. The threshold values may be based on the hardware and software configuration of the POS terminal. In some implementations, the name 814 is printed on the payment object reader 806, while in some cases, the name is an alias and the computing device 602 sends the alias selection to an external server for confirmation. The user can select one of the options 813 to confirm whether the name 814 displayed on the user interface 812 matches the name that is printed on the wireless card reader. The computing device 502 can send the selected name 814 to the wireless card reader. The payment object reader 606 (or optionally, the payment processing system) can evaluate the name 814 received from the computing device 502 to determine whether the name 814 matches the name printed on the wireless card reader. If the name 814 matches the name printed on the payment object reader 606, the computing device 502 is then asked to enter public and private keys to pair with the payment object reader 606.

Figure 9:
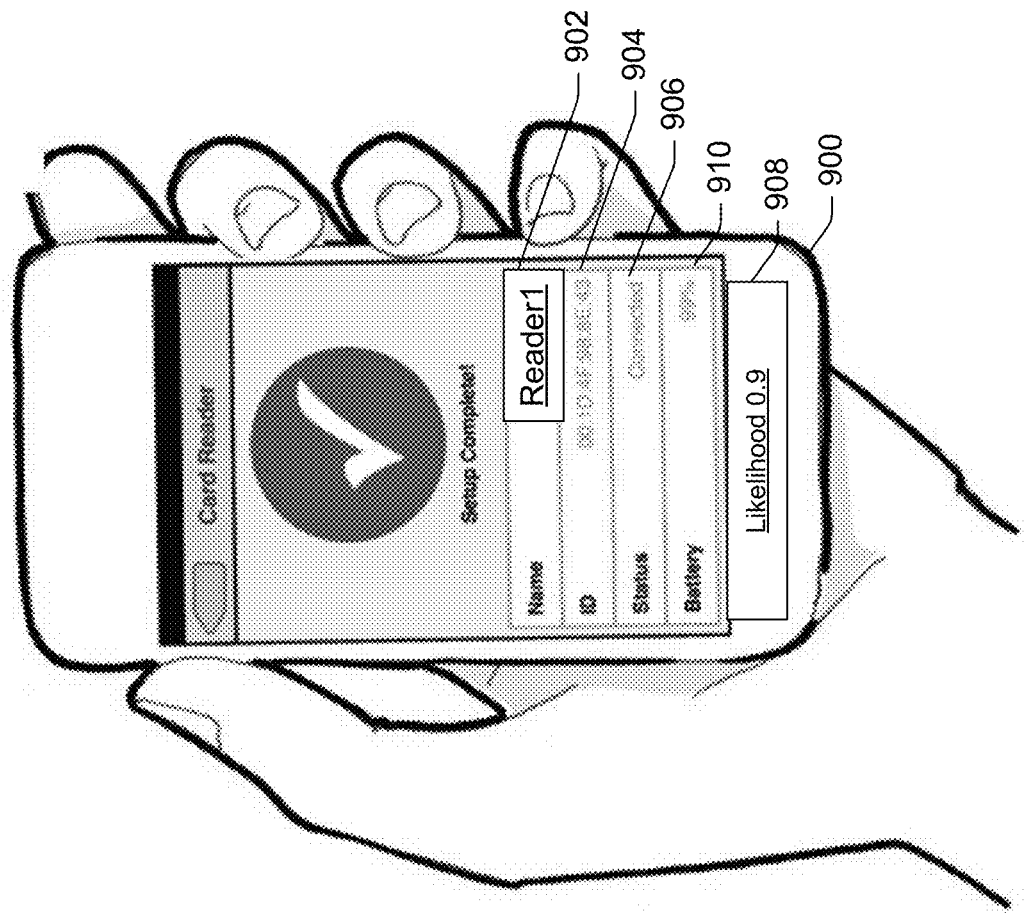
FIG. 9 illustrates an example user interface, being presented on the POS terminal, for confirming a pairing of the POS terminal with the payment object reader, according to an exemplary embodiment of the present subject matter.

FIG. 9 illustrates an example user interface 900 being presented on the computing device 502, for confirming a pairing of the computing device 502 with the payment object reader 606. In FIG. 9, the user interface 900 presents the user with information confirming the pairing of the computing device 502 with the wireless card reader 606. Depending on the implementation, the information can include a graphic 902 indicating a successful pairing, an identification number 904 for the payment object reader 606, a connection status 906 (e.g., "connected") of the payment object reader 606, the likelihood of the reader being the intended reader 908 on a scale of 0 to 1, and the remaining battery life 910 of the payment object reader 806. The likelihood of the reader 606 being the intended reader 908 is computed based on delta of RSSI and absolute RSSI levels as mentioned previously.

Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

Although the present subject matter has been described with reference to specific exemplary embodiments, it will be recognized that the subject matter is not limited to the embodiments described, but can be practiced with modification and alteration within the spirit and scope of the appended claims. Accordingly, the specification and drawings are to be regarded in an illustrative sense rather than a restrictive sense. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof.

What is claimed is:

1. A method for pairing a first wireless device with a second wireless device, the method comprising:
   determining, by a wireless transceiver of the second wireless device, a first value of signal strength of a wireless signal of the first wireless device transmitted from a first location of the first wireless device, the first location of the first wireless device being proximate to a second location of the second wireless device;
   causing, by a processor of the second wireless device, one or more visual cues to be output on a graphical user interface of the second wireless device, the one or more visual cues including instructions for a user to physically move the first wireless device in at least one direction to arrive at a third location, the third location being proximate to one or more of (i) the second location or (ii) a fourth location of a third wireless device;
   determining, by the wireless transceiver of the second wireless device and based at least in part on monitoring the wireless signal of the first wireless device, a second value of signal strength of the wireless signal of the first wireless device transmitted from the third location of the first wireless device;
   determining, by the processor of the second wireless device, a variation in signal strength between the first value and the second value;
   identifying, by the processor of the second wireless device, the first wireless device for pairing with the second wireless device based on determining that the variation in signal strength from the first value of signal strength to the second value of signal strength indicates the first wireless device has moved in the at least one direction indicated by the instructions in the one or more visual cues; and
   establishing, by the processor of the second wireless device, a wireless communication channel between the first wireless device and the second wireless device.

2. The method of claim 1, further comprising:
   configuring the first wireless device for pairing mode, wherein configuring includes receiving an indication of user engagement with a pairing button on the first wireless device; and
   configuring the second wireless device for pairing mode, wherein the configuring of the second wireless device includes receiving an indication of an interaction with a mobile payment application on the second wireless device.

3. The method of claim 1, further comprising:
   detecting a plurality of wireless devices, including the first wireless device and the third wireless device, in proximity to the second wireless device;
   generating, on the graphical user interface of the second wireless device and for presentation on the graphical user interface, a list of the plurality of wireless devices, including the first wireless device, wherein the list arranges the plurality of wireless devices in an order based on one or more of the proximity to the second wireless device, the first value of signal strength, or the second value of signal strength; and re-arranging, based on the variation from the first value of signal strength to the second value of signal strength, the order of the plurality of wireless devices.

4. The method of claim 3, further comprising tracking, by the processor of the second wireless device, a differential value of signal strength based at least on the first value of signal strength and the second value of signal strength, wherein the differential value of signal strength indicates movement of the first wireless device from the first location to the third location, with respect to the second wireless device; and
selecting, by the processor of the second wireless device, the first wireless device from the list of the plurality of wireless devices based at least in part on the differential value of signal strength.

5. The method of claim 1, wherein the first location corresponds to a current position of the first wireless device and the third location corresponds to a new position of the first wireless device, and wherein the method further comprises:
allocating, by the processor of the second wireless device, a time within which to move the first wireless device to the new position, wherein the new position is different from the current position;
receiving, by the second wireless device, an indication of user engagement in terms of movement of the first wireless device; and
receiving, by the second wireless device, confirmation that the first wireless device was moved in the at least one direction instructed by the one or more visual cues within the time, wherein the new position corresponds to the at least one direction in which the first wireless device was moved as instructed by the one or more visual cues.

6. The method of claim 5, further comprising:
determining that the first wireless device was either moved in a direction contrary to the instructions included in the one or more visual cues or not moved within the time; and
in response to the determination, re-starting the time and re-generating the visual cues for user engagement.

7. The method of claim 3, further comprising:
generating one or more other visual cues to direct the user to position the first wireless device at a predetermined distance from the second wireless device, wherein the predetermined distance is determined based on a communication protocol of the wireless communication channel;
determining a third value of signal strength corresponding to the first wireless device when placed at the predetermined distance from the second wireless device;
comparing the third value of signal strength to a threshold value, wherein the threshold value is selected or calibrated based at least on hardware or software configuration of the second wireless device; and
if the third value of signal strength is greater than the threshold value, prioritizing the first wireless device over other wireless devices on the list.

8. The method of claim 1, wherein identifying further comprises:
generating a request, for the first wireless device, for display of an optical representation of one or more pairing parameters;
capturing, by a sensor associated with the second wireless device, a sensor input of the optical representation of the one or more pairing parameters as displayed on the first wireless device in response to the request; and
in response to determining that the sensor input matches with the optical representation of the one or more pairing parameters, receiving, by the wireless transceiver, a permission from the first wireless device to establish the wireless communication channel between the first wireless device and the second wireless device for exchange of information.

9. The method of claim 8, further comprising:
receiving an optical representation of a security token, wherein the optical representation of the security token is configured to be transmitted in one or more colors, brightness, lightness, or intensities through one or more light indicators;
capturing as one of a user input or another sensor input by the second wireless device, a second user input from the second wireless device; and
in response to determining that the second user input matches with the optical representation of the security token, receiving, by the wireless transceiver, another permission from the first wireless device to convert the wireless communication channel into a secure wireless communication channel.

10. A point-of-sale (POS) wireless device configured for pairing with a wireless payment object reader, the POS wireless device comprising one or more components storing one or more instructions that, when executed by a processor of the POS wireless device, cause the POS wireless device to:
determine, by a POS wireless transceiver of the POS wireless device, a first value of signal strength of a wireless signal of the wireless payment object reader, wherein the first value is associated with a first location of the wireless payment object reader proximate to the POS wireless device, and wherein the POS wireless transceiver is configured to communicate with the wireless payment object reader on a wireless communication protocol;
cause, by the processor, one or more visual cues to be output via a graphical user interface of the POS wireless device, the one or more visual cues including instructions for a user to physically move the wireless payment object reader in at least one direction to arrive at a second location, the second location being proximate to one or more of (i) the POS wireless device or (ii) at least one other wireless payment object reader;
determine, by the POS wireless transceiver, a second value of signal strength of the wireless signal of the wireless payment object reader wherein the second value is associated with the second location of the wireless payment object reader;
determine, by the processor, a variation in signal strength between the first value and the second value;
identify, by the processor, the wireless payment object reader as an intended candidate for pairing with the POS wireless device based on determining that the variation in signal strength from the first value of signal strength to the second value of signal strength indicates the wireless payment object reader has moved in the at least one direction indicated by the instructions in the one or more visual cues; and
establish, by the processor, a wireless communication channel between the POS wireless device and the wireless payment object reader for exchange of information, wherein:
the wireless communication channel enables the POS wireless device to receive data read off a payment object through the wireless payment object reader and transfer the data read off the payment object to a payment processing system.

11. The POS wireless device of claim 10, further comprising an accelerometer to track motion of the wireless payment object reader with respect to the POS wireless device.

12. The POS wireless device of claim 10, wherein the graphical user interface is configured to present an order of wireless devices, including the wireless payment object reader, wherein the order is based on determining the variation in signal strength from the first value of signal strength to the second value of signal strength.

13. The POS wireless device of claim 10, wherein the one or more components comprise a signal strength component configured to:
  measure signal strength in terms of received signal strength indicator (RSSI) level corresponding to the wireless payment object reader corresponding to one or more positions of the wireless payment object reader; and
  compare the RSSI level to a custom threshold level, wherein the custom threshold level is customized according to hardware and software configurations of the POS wireless device.

14. The POS wireless device of claim 10, wherein the one or more components comprise a signal strength component configured to:
  allocate, by the processor of the POS wireless device, a time within which to move the wireless payment object reader to the second location, wherein the second location is different from the first location;
  receive, by the POS wireless device, an indication of user engagement in terms of movement of the wireless payment object reader; and
  receive, by the POS wireless device, confirmation that the wireless payment object reader was moved in the at least one direction as instructed by the one or more visual cues within the time, wherein the second location corresponds to the at least one direction in which the wireless payment object reader was moved as instructed by the one or more visual cues.

15. One or more non-transitory computer-readable media maintaining instructions that, when executed by one or more processors, program the one or more processors to:
  determine, by a wireless transceiver of a second wireless device, a first value of signal strength of a wireless signal of a first wireless device, wherein the first value is associated with a first location of the first wireless device, the first location being proximate to a second location of the second wireless device;
  cause, by a processor of the second wireless device, one or more visual cues to be output via a graphical user interface of the second wireless device, the one or more visual cues including instructions for a user to physically move the first wireless device in at least one direction to arrive at a third location, the third location being proximate to one or more of (i) the second location or (ii) a fourth location of a third wireless device;
  determine, by the wireless transceiver of the second wireless device, a second value of signal strength of the wireless signal of the first wireless device, wherein the second value is associated with the third location of the first wireless device;
  determine, by the processor of the second wireless device, a variation in signal strength between the first value and the second value;
  identify, by the processor of the second wireless device, the first wireless device as an intended candidate for pairing with the second wireless device based on determining that the variation in signal strength from the first value of signal strength to the second value of signal strength indicates the second wireless device has moved in the at least one direction indicated by the instructions in the one or more visual cues; and
  establish, by the processor of the second wireless device, a wireless communication channel between the first wireless device and the second wireless device for exchange of information.

16. The one or more non-transitory computer-readable media of claim 15, wherein the instructions further program the one or more processors to:
  configure the first wireless device for pairing mode, wherein configuring the first wireless device includes receiving an indication of user engagement with a pairing button on the first wireless device; and
  configure the second wireless device for pairing mode, wherein configuring the second wireless device includes receiving an indication of an interaction with a mobile payment application on the second wireless device.

17. The one or more non-transitory computer-readable media of claim 15, wherein the instructions further program the one or more processors to:
  detect a plurality of wireless devices, including the first wireless device and the third wireless device, in proximity to the second wireless device;
  generate, on the graphical user interface of the second wireless device and for presentation on the graphical user interface, a list of the plurality of wireless devices, including the first wireless device, wherein the list arranges the plurality of wireless devices in an order based on one or more of the proximity to the second wireless device, the first value, or the second value; and
  re-arrange, based on determining the variation from the first value of signal strength to the second value of signal strength, the order of the plurality of wireless devices.

18. The one or more non-transitory computer-readable media of claim 15, wherein the second wireless device further comprises an accelerometer to track motion of the first wireless device with respect to the second wireless device.

19. The one or more non-transitory computer-readable media of claim 15, wherein the first wireless device corresponds to a first wireless payment object reader, the second wireless device corresponds to a point-of-sale (POS) wireless device, and the third wireless device corresponds to a second wireless payment object reader.

20. A system for pairing a first wireless device with a second wireless device, the system comprising:
  one or more processors;
  one or more non-transitory computer-readable media maintaining instructions that, when executed by one or more processors, cause the one or more processors to:
    determine, by a wireless transceiver of the second wireless device, a first value of signal strength of a wireless signal of the first wireless device, wherein the first value is associated with a first location of the first wireless device, the first location being proximate to a second location of the second wireless device;
    cause, by a processor of the second wireless device, one or more visual cues to be output via a graphical user interface of the second wireless device, the one or more visual cues including instructions for a user to physically move the first wireless device in at least one direction to arrive at a third location, the third location being proximate to one or more of (i) the second location or (ii) a fourth location of a third wireless device;

determine, by the wireless transceiver of the second wireless device, a second value of signal strength of the wireless signal of the first wireless device, wherein the second value is associated with the third location of the first wireless device;

determine, by the processor of the second wireless device, a variation in signal strength between the first value and the second value;

identify, by the processor of the second wireless device, the first wireless device as an intended candidate for pairing with the second wireless device based on determining that the variation in signal strength from the first value of signal strength to the second value of signal strength indicates the second wireless device has moved in the at least one direction indicated by the instructions in the one or more visual cues; and establish, by the processor of the second wireless device, a wireless communication channel between the first wireless device and the second wireless device for exchange of information.

21. The system of claim 20, wherein the first wireless device corresponds to a wireless payment object reader, the second wireless device corresponds to a point-of-sale (POS) wireless device, and the third wireless device corresponds to a second wireless payment object reader.

22. The system of claim 21, wherein the second wireless device further comprises a signal strength component configured to:

measure signal strength in terms of received signal strength indicator (RSSI) level corresponding to the wireless payment object reader corresponding to one or more positions of the wireless payment object reader; and compare the RSSI level to a custom threshold level, wherein the custom threshold level is customized according to hardware and software configurations of the POS wireless device.

23. A method implemented by a point-of-sale (POS) wireless device, the method comprising:

determining, by a wireless transceiver of the POS wireless device, a first value of signal strength of a wireless signal of a wireless device, wherein the first value is associated with a first location of the wireless device proximate to the POS wireless device;

causing, by a processor of the of the POS wireless device, one or more visual cues to be output via a graphical user interface of the POS wireless device, the one or more visual cues including instructions for a user to physically move the wireless device in at least one direction to arrive at a second location, the second location being proximate to one or more of (i) the POS wireless device or (ii) a third location of a second wireless device;

determining, by the wireless transceiver of the POS wireless device, a second value of signal strength of the wireless signal of the wireless device, wherein the second value is associated with the second location of the wireless device;

determining, by the processor of the POS wireless device, a variation in signal strength between the first value and the second value;

identifying, by the processor of the POS wireless device, the wireless device for pairing with the POS wireless device based on determining that the variation in signal strength from the first value of signal strength to the second value of signal strength indicates the second wireless device has moved in the at least one direction indicated by the instructions in the one or more visual cues; and establishing, by the processor of the POS wireless device, a wireless communication channel between the wireless device and the POS wireless device.

24. The method of claim 23, further comprising:

detecting a plurality of wireless devices, including the wireless device and the other wireless device, in proximity to the POS wireless device;

generating, on the graphical user interface of the POS wireless device, a list of the plurality of wireless devices, including the wireless device, wherein the list arranges plurality of wireless devices in an order based on at least one of the proximity to the POS wireless device, the first value, or the second value, the list being displayed on the graphical user interface; and re-arranging the order of the plurality of wireless devices according to the first value of signal strength and the second value of signal strength.

25. The method of claim 23, further comprising:

generating a request, for the wireless device, to display an optical representation of one or more pairing parameters;

capturing, by a sensor associated with the POS wireless device, a sensor input of the optical representation of the one or more pairing parameters as displayed on the wireless device in response to the request; and in response to determining that the sensor input matches with the optical representation of the one or more pairing parameters, receiving, by the wireless transceiver, a permission from the wireless device to establish the wireless communication channel between the wireless device and the POS wireless device for exchange of information.

* * * * *